United States Patent
Watanabe et al.

(10) Patent No.: US 11,091,662 B2
(45) Date of Patent: *Aug. 17, 2021

(54) INK COMPOSITION, INK SET, IMAGE FORMING METHOD, AND PRINTED MATTER

(71) Applicant: FUJIFILM Corporation, Tokyo (JP)

(72) Inventors: Kosuke Watanabe, Kanagawa (JP); Yushi Hongo, Kanagawa (JP); Kensuke Masui, Kanagawa (JP); Naoharu Kiyoto, Kanagawa (JP); Toshiyuki Makuta, Kanagawa (JP); Kazuhiro Hamada, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 336 days.

This patent is subject to a terminal disclaimer.

(21) Appl. No.: 16/111,417

(22) Filed: Aug. 24, 2018

(65) Prior Publication Data

US 2018/0362790 A1  Dec. 20, 2018

Related U.S. Application Data

(63) Continuation of application No. PCT/JP2016/088995, filed on Dec. 27, 2016.

(30) Foreign Application Priority Data

Feb. 29, 2016  (JP) .................... 2016-037730
May 30, 2016  (JP) .................... 2016-107302

(51) Int. Cl.
| | | |
|---|---|---|
| *C09D 11/38* | (2014.01) | |
| *C09D 11/322* | (2014.01) | |
| *C09D 11/40* | (2014.01) | |
| *C08K 3/08* | (2006.01) | |
| *C08K 5/378* | (2006.01) | |
| *C09D 11/08* | (2006.01) | |
| *C09D 11/52* | (2014.01) | |
| *B41M 5/00* | (2006.01) | |
| *B41J 2/165* | (2006.01) | |

(52) U.S. Cl.
CPC ............. *C09D 11/38* (2013.01); *B41M 5/00* (2013.01); *C08K 3/08* (2013.01); *C08K 5/378* (2013.01); *C09D 11/08* (2013.01); *C09D 11/322* (2013.01); *C09D 11/40* (2013.01); *C09D 11/52* (2013.01); *B41J 2/165* (2013.01); *C08K 2003/0806* (2013.01); *C08K 2003/0831* (2013.01); *C08K 2201/001* (2013.01); *C08K 2201/003* (2013.01); *C08K 2201/016* (2013.01)

(58) Field of Classification Search
None
See application file for complete search history.

(56) References Cited

U.S. PATENT DOCUMENTS

| | | | |
|---|---|---|---|
| 10,215,893 B2* | 2/2019 | Kiyoto | G06F 3/0317 |
| 2006/0266157 A1* | 11/2006 | Takata | B22F 1/0025 75/255 |
| 2007/0076069 A1* | 4/2007 | Edwards | C09D 11/322 347/100 |
| 2008/0145628 A1 | 6/2008 | Oyanagi et al. | |
| 2008/0182085 A1 | 7/2008 | Oyanagi et al. | |
| 2009/0246358 A1* | 10/2009 | Winkel | C09D 5/24 427/98.5 |
| 2010/0209677 A1 | 8/2010 | Sano et al. | |
| 2011/0039078 A1* | 2/2011 | Brennan Fournet | B82Y 30/00 428/195.1 |
| 2011/0279611 A1 | 11/2011 | Kagata et al. | |
| 2012/0040156 A1* | 2/2012 | Ohashi | C09D 11/38 428/207 |
| 2012/0101007 A1 | 4/2012 | Ahern et al. | |
| 2012/0301639 A1 | 11/2012 | Grigorenko et al. | |
| 2013/0071651 A1* | 3/2013 | Hakuta | C03C 17/34 428/333 |
| 2013/0079453 A1 | 3/2013 | Kraiter et al. | |
| 2013/0088553 A1 | 4/2013 | Maennig et al. | |
| 2013/0122281 A1* | 5/2013 | Hakuta | G02B 5/206 428/323 |
| 2013/0260139 A1* | 10/2013 | Kamada | C03C 17/007 428/328 |
| 2013/0335495 A1 | 12/2013 | Umebayashi | |
| 2014/0004338 A1* | 1/2014 | Kiyoto | G02B 5/206 428/328 |

(Continued)

FOREIGN PATENT DOCUMENTS

| | | |
|---|---|---|
| CN | 101204877 A | 6/2008 |
| CN | 101235237 A | 8/2008 |

(Continued)

OTHER PUBLICATIONS

English translation of JP 2008/174712, Jul. 2008; 32 pages.*
English translation of JP 2011/252213, Dec. 2011; 26 pages.*
English translation of KR 2014/0098922, Aug. 2014; 18 pages.*
English translation of JP 2008/003150, Jan. 2008; 50 pages.*
English translation of JP 2005/105376, Apr. 2005; 14 pages.*
English translation of JP 2009/144188, Jul. 2009; 20 pages.*
Extended European Search Report dated Dec. 6, 2018 issued by the European Patent Office in counterpart application No. 16892751.5.
International Search Report issued in International Application No. PCT/JP2016/088995 dated Mar. 14, 2017 [PCT/ISA/210].

(Continued)

*Primary Examiner* — Helene Klemanski
(74) *Attorney, Agent, or Firm* — Sughrue Mion, PLLC

(57) ABSTRACT

Provided is an ink composition used for image formation by an ink jet method. The ink composition includes plate-like metal particles that include a metal element having a standard oxidation-reduction potential nobler than −1.65 V, that have an average equivalent circle diameter of 10 nm or more and less than 500 nm, and that have an average aspect ratio, which is the ratio of the average equivalent circle diameter to an average thickness, of 3 or more. Also provided are an ink set, an image forming method, and a printed matter.

16 Claims, No Drawings

(56) References Cited

U.S. PATENT DOCUMENTS

| | | | |
|---|---|---|---|
| 2014/0220319 A1 | 8/2014 | Koike et al. | |
| 2014/0272386 A1* | 9/2014 | Kiyoto | C03C 17/366 |
| | | | 428/328 |
| 2015/0115202 A1 | 4/2015 | Kagata | |
| 2017/0001242 A1 | 1/2017 | Nakao | |
| 2017/0261661 A1* | 9/2017 | Kiyoto | G02B 5/12 |
| 2018/0348406 A1* | 12/2018 | Matsuno | G02B 1/11 |
| 2018/0362789 A1* | 12/2018 | Kiyoto | C09D 11/08 |
| 2019/0359837 A1* | 11/2019 | Harada | C09D 11/08 |
| 2019/0359840 A1* | 11/2019 | Kiyoto | C09D 11/322 |
| 2020/0181434 A1* | 6/2020 | Harada | B82Y 30/00 |
| 2020/0181435 A1* | 6/2020 | Harada | C09D 7/70 |

FOREIGN PATENT DOCUMENTS

| | | | |
|---|---|---|---|
| CN | 101746175 A | 6/2010 | |
| CN | 101959974 A | 1/2011 | |
| CN | 102248782 A | 11/2011 | |
| CN | 102959021 A | 3/2013 | |
| CN | 103402781 A | 11/2013 | |
| CN | 103963462 A | 8/2014 | |
| JP | 11-323223 A | 11/1999 | |
| JP | 2003-306625 A | 10/2003 | |
| JP | 2004-276423 A | 10/2004 | |
| JP | 2005-105376 A | 4/2005 | |
| JP | 2008-3150 A | 1/2008 | |
| JP | 2008-174712 A | 7/2008 | |
| JP | 2008-523246 A | 7/2008 | |
| JP | 2009507692 A | 2/2009 | |
| JP | 2009-144188 A | 7/2009 | |
| JP | 2011-149028 A | 8/2011 | |
| JP | 2011-246718 A | 12/2011 | |
| JP | 2011-252213 A | 12/2011 | |
| JP | 2012-41378 A | 3/2012 | |
| JP | 2012-143871 A | 8/2012 | |
| JP | 2013-512291 A | 4/2013 | |
| JP | 2015-83628 A | 4/2015 | |
| KR | 10-2014-0098922 A | 8/2014 | |
| WO | 2009/130689 A2 | 10/2009 | |
| WO | 2015/146977 A1 | 10/2015 | |
| WO | WO 2016/084542 A1 * | 6/2016 | |
| WO | WO 2017/149918 A1 * | 9/2017 | |

OTHER PUBLICATIONS

Written Opinion of the ISA issued in International Application No. PCT/JP2016/088995 dated Mar. 14, 2017 [PCT/ISA/237].

Written Opinion of the IPEA issued in International Application No. PCT/JP2016/088995 dated Jul. 4, 2017 [PCT/IPEA/408].

International Preliminary Report on Patentability issued in International Application No. PCT/JP2016/088995 dated Nov. 22, 2017 [PCT/IPEA/409].

Communication dated Jun. 4, 2019, from the Japanese Patent Office in counterpart application No. 2018-502543.

Communication dated Oct. 19, 2020 in from the European Patent Office in Application No. 16892751.5.

Office Action dated Nov. 23, 2020 in Chinese Application No. 201680082697.9.

Putong Huaxue, "General Chemistry", Aug. 31, 2012, p. 92 (3 pages total).

"Quality of Printed Matters and Detection Technology", May 31, 2006, p. 143 (3 pages total).

Cheng, "Application of Nanometer Printing Ink in the Electronics Industry", Dec. 31, 2010, No. 6, pp. 19-22 (3 pages total) •.

* cited by examiner

INK COMPOSITION, INK SET, IMAGE FORMING METHOD, AND PRINTED MATTER

CROSS-REFERENCE TO RELATED APPLICATIONS

This application is a continuation application of International Application No. PCT/JP2016/088995, filed Dec. 27, 2016, the disclosure of which is incorporated herein by reference in its entirety. Further, this application claims priority from Japanese Patent Application No. 2016-037730, filed Feb. 29, 2016, and Japanese Patent Application No. 2016-107302, filed May 30, 2016, the disclosures of which are incorporated herein by reference in their entirety.

BACKGROUND OF THE INVENTION

1. Field of the Invention

The present disclosure relates to an ink composition, an ink set, an image forming method, and a printed matter.

2. Description of the Related Art

Ink compositions containing metal particles have hitherto been known.

For example, there is known an ink composition that includes aluminum, which is employed because it is a relatively inexpensive metal material, that has high preservation stability, and that has a high metallic specular gloss such that its values of specular glossiness at 20°, 60°, and 85° are not less than 200, 200, and 100, respectively. The ink composition includes a pigment dispersion including a metal pigment made of plate-like metal particles, and when the major axis on a plane of the plate-like metal particle is X, the minor axis is Y, and the thickness of the particle is Z, R50, which is a 50% average particle size of an equivalent circle diameter determined from the area of the X-Y plane of the plate-like metal particle, is 0.5 to 3 μm, and the condition R50/Z>5 is satisfied (see, for example, JP2008-174712A).

There is also known an ink composition that can produce a recorded matter having a metallic luster, that has high recording stability, that is usable for a wide variety of media (recording media), and that has high fixability. The ink composition contains a pigment, an organic solvent, and a fixing resin. The pigment is made of metal foil flakes having an average thickness of 30 nm or more and 100 nm or less, a 50% volume average particle size of 1.0 μm or more and 4.0 μm or less, and a maximum particle size in particle size distribution of 12 μm or less (see, for example, JP2011-149028A).

There is also known a dispersion of finely powdered thin flakes. The finely powdered thin flakes are treated so as not to readily precipitate, and a metallic pigment obtained using the finely powdered thin flakes provides an ink in which the finely powdered thin flakes are dispersed, with the result that nozzle clogging is prevented, and a printed matter having a rich metallic luster can be provided. The dispersion of finely powdered thin flakes includes a solvent containing finely powdered thin flakes obtained by pulverizing an elemental metal, an alloy, or a metal compound. The finely powdered thin flakes have an average major axis of 0.5 μm or more and 5.0 μm or less, a maximum major axis of 10 μm or less, and average thickness of 5 nm or more and 100 nm or less, and an aspect ratio of 20 or more (more preferably 40 or more). An ink jet printer metallic pigment ink obtained using the dispersion of finely powdered thin flakes is also known (see, for example, JP2011-246718A).

There is also known an inkjet ink that enables printing of variable print having a metallic effect. The inkjet ink contains metallic nanoparticles having an average particle size of less than about 50 nm (see, for example, JP2009-507692A).

There is also known an ink that is able to form an image having an excellent metallic luster while also having high fixability to printing media. The ink includes silver particles having an average particle size of 3 nm or more and 100 nm or less (see, for example, JP2012-143871A).

There is also known an ink composition that can be used to form an image having an excellent metallic luster while also having high abrasion resistance. The ink composition includes silver particles having an average particle size of 5 nm or more and 100 nm or less, wax particles, and water (see, for example, JP2012-041378A).

There is also known a conductive ink for ink jet printing, which conductive ink is suitable for use in the formation of electronic circuits and includes a dispersion of silver particles having silver particles with a cubic or tabular morphology. The dispersion of silver particles has a size distribution with a coefficient of variation of up to 0.5 (see, for example, JP2008-523246A).

SUMMARY OF THE INVENTION

However, the ink composition disclosed in JP2008-174712A, which includes aluminum particles as plate-like metal particles, may form an image having reduced specular glossiness due to oxidation of the surface of the aluminum particles. The oxidation of the surface of the aluminum particles and the reduction in the specular glossiness of an image are likely to occur particularly when the ink contains water.

The metal particles contained in the ink compositions disclosed in JP2008-174712A and JP2011-149028A have large particle sizes, and thus the metal particles are poorly dispersed. Thus, when the ink compositions disclosed in JP2008-174712A and JP2011-149028A are applied to the image formation by an ink jet method, clogging of ink jet head nozzles is likely to occur (i.e., the ejectability through ink jet head nozzles is likely to be reduced).

The ink jet printer metallic pigment ink disclosed in JP2011-246718A, which also contains metal particles having a large particle size, is likely to cause clogging of ink jet head nozzles.

The clogging of ink jet head nozzles described above is effectively suppressed by decreasing the particle size of metal particles in the ink composition.

However, when the particle size of metal particles is decreased as in the ink compositions disclosed in JP2009-507692A, JP2012-143871A, and JP2012-041378A, an image having specular glossiness may not be obtained, although nozzle clogging may be suppressed and an image having a metallic luster may be obtained. For example, when the metal particles are spherical or cubic, an image having specular glossiness may not be obtained under the influence of light scattering on the surface of the metal particles.

The conductive ink disclosed in JP2008-523246A is a conductive ink for forming an electronic circuit by an ink jet method and is not an ink for forming an image. Therefore, in JP2008-523246A, forming an image is not focused, and thus as a matter of course, forming an image having specular glossiness is not focused at all.

As described above, it has been difficult to form an image having specular glossiness with the ink composition disclosed in JP2009-507692A, JP2012-143871A, JP2012-041378A, or JP2008-523246A.

In addition, the ink compositions disclosed in JP2008-174712A, JP2011-149028A, and JP2011-246718A disadvantageously have poor ejectability through ink jet head nozzles (i.e., are likely to cause nozzle clogging), as described above.

The present disclosure has been made in view of the foregoing and aims to provide an ink composition having high ejectability through an ink jet head and being able to form an image having specular glossiness, an ink set having the ink composition, an image forming method using the ink composition, and a printed matter including an image having specular glossiness.

Specific means for solving the problems described above include the following aspects.

<1> An ink composition used for image formation by an ink jet method, the ink composition containing plate-like metal particles that include a metal element having a standard oxidation-reduction potential nobler than −1.65 V, that have an average equivalent circle diameter of 10 nm or more and less than 500 nm, and that have an average aspect ratio, which is the ratio of the average equivalent circle diameter to an average thickness, of 3 or more.

<2> The ink composition according to <1>, wherein the metal element having a standard oxidation-reduction potential nobler than −1.65 V is at least one metal element selected from the group consisting of gold, silver, and platinum.

<3> The ink composition according to <1> or <2>, wherein the plate-like metal particles include silver in an amount of 80% by mass or more relative to the total amount of the plate-like metal particles.

<4> The ink composition according to any one of <1> to <3>, wherein the average aspect ratio of the plate-like metal particles is 5 or more.

<5> The ink composition according to any one of <1> to <4>, wherein a content of the plate-like metal particles is 3% to 8% by mass relative to the total amount of the ink composition.

<6> The ink composition according to any one of <1> to <5>, containing water.

<7> The ink composition according to <6>, containing gelatin.

<8> The ink composition according to <7>, wherein a ratio of a mass content of the plate-like metal particles to a mass content of the gelatin is 1 to 100.

<9> The ink composition according to any one of <1> to <8>, containing an organic solvent.

<10> The ink composition according to any one of <1> to <9>, containing at least one surfactant selected from the group consisting of fluorosurfactants and acetylene glycol surfactants.

<11> The ink composition according to any one of <1> to <10>, wherein the ink composition is used for decorative printing by an ink jet method.

<12> An ink set having:

a first ink that is the ink composition according to any one of <1> to <11>; and a second ink that is different from the first ink, the second ink containing a coloring agent.

<13> An image forming method having an ink application step of applying the ink composition according to any one of <1> to <11> to a substrate by an ink jet method.

<14> The image forming method according to <13>, wherein in the ink application step, the ink composition is applied to the substrate by ejecting the ink composition through a nozzle of an ink jet head, the nozzle having a nozzle diameter of less than 25 μm.

<15> An image forming method that uses the ink set according to <12>, the method having:

a first ink application step of applying the first ink to a substrate by an ink jet method; and a second ink application step of applying the second ink to the substrate by the ink jet method.

<16> A printed matter including:

a substrate; and an image disposed on the substrate, the image containing plate-like metal particles that include a metal element having a standard oxidation-reduction potential nobler than −1.65 V, that have an average equivalent circle diameter of 10 nm or more and less than 500 nm, and that have an average aspect ratio, which is the ratio of the average equivalent circle diameter to an average thickness, of 3 or more.

<17> The printed matter according to <16>, further comprising a color image containing a coloring agent, the color image being disposed on the image containing the plate-like metal particles and/or between the substrate and the image containing the plate-like metal particles.

The present disclosure provides an ink composition having high ejectability through an ink jet head and being able to form an image having specular glossiness, an ink set having the ink composition, an image forming method using the ink composition, and a printed matter including an image having specular glossiness.

DESCRIPTION OF THE PREFERRED EMBODIMENTS

Specific embodiments of the present invention will now be described in detail, but the following embodiments are not intended to limit the present invention.

In this specification, every numerical range expressed using " . . . to . . . " indicates a range including the numerical values before and after "to" as the minimum value and the maximum value.

In this specification, if there are two or more substances corresponding to one component in a composition, the amount of the component in the composition means the total amount of the two or more substances in the composition unless otherwise specified.

In this specification, the term "step" encompasses not only a separate step but also a step that is not clearly distinguished from another step if the desired object of the step is achieved.

In this specification, "light" is a concept that encompasses active energy rays such as γ-rays, β-rays, electron beams, ultraviolet radiation, visible radiation, and infrared radiation.

Ink Composition

An ink composition (hereinafter also referred to simply as an "ink") according to the present disclosure contains plate-like metal particles that include a metal element having a standard oxidation-reduction potential nobler than −1.65 V, that have an average equivalent circle diameter of 10 nm or more and less than 500 nm, and that have an average aspect ratio, which is the ratio of the average equivalent circle diameter to an average thickness, of 3 or more.

The ink according to the present disclosure is used for image formation by an ink jet method.

The ink according to the present disclosure has high ejectability through ink jet head nozzles. The ink according to the present disclosure is able to form an image having specular glossiness.

In this specification, having high ejectability through ink jet head nozzles means that nozzle clogging can be suppressed when an ink is ejected through ink jet head nozzles.

In this specification, ejectability through ink jet head nozzles may be referred to simply as "ejectability".

The reason why the ink according to the present disclosure provides the benefits described above is presumably as follows. However, the ink according to the present disclosure is not limited by the following reason.

The inventors have discovered that clogging of ink jet head nozzles is effectively suppressed when the average equivalent circle diameter of metal particles in ink is less than 500 nm.

However, it has been found that when the average equivalent circle diameter of metal particles is less than 500 nm, an image having specular glossiness may not be obtained according to the shape of the metal particles, although an image having a metallic luster may be obtained. For example, when the metal particles are spherical or cubic, the specular glossiness of an image may be reduced due to light scattering on the surface of the metal particles. Even in the case where the metal particle are plate-like metal particles, if the aspect ratio of the plate-like metal particles is low, the specular glossiness of an image may be reduced due to the low alignment properties of the plate-like metal particles in the image and to light scattering on side surfaces (surfaces other than the two principal surfaces) of the plate-like metal particles.

Here, the specular glossiness of an image indicates so high glossiness that a substance facing the image is mirrored and is distinguished from a mere metallic luster (see, for example, "Evaluation Criteria for Specular Glossiness of Image (Sensory Evaluation)" in EXAMPLES described later).

Regarding the specular glossiness of an image, the ink according to the present disclosure contains plate-like metal particles as metal particles, and the plate-like metal particles have an average aspect ratio of 3 or more, thus enabling the formation of an image having specular glossiness. This is presumably due to the following reason. That is, since the ink contains plate-like metal particles as metal particles, and the plate-like metal particles have an average aspect ratio of 3 or more, an image is formed in which the alignment properties of the plate-like metal particles are improved and in which light scattering on the side surfaces (surfaces other than the principal surfaces) of the plate-like metal particles is reduced, with the result that the image is provided with a specular gloss.

Here, the average aspect ratio of plate-like metal particles refers to the ratio of the average equivalent circle diameter to the average thickness [average equivalent circle diameter/average thickness] of the plate-like metal particles.

Methods for determining the average equivalent circle diameter, the average thickness, and the average aspect ratio will be described later.

In the ink according to the present disclosure, since the plate-like metal particles include a metal element having a standard oxidation-reduction potential nobler than −1.65 V, oxidation of the plate-like metal particles can be inhibited, and thus the oxidation-induced reduction in the specular glossiness of an image can be suppressed.

In this specification, the specular glossiness of an image is evaluated by using its 20° gloss value and 60° gloss value and by sensory evaluation (image evaluation by visual observation).

For both the 20° gloss value and the 60° gloss value, higher values indicate that the image has higher specular glossiness.

The plate-like metal particles may include one single or two or more metal elements having standard oxidation-reduction potentials nobler than −1.65 V.

The metal element having a standard oxidation-reduction potential nobler than −1.65 V is preferably gold (Au), silver (Ag), platinum (Pt), copper (Cu), nickel (Ni), or rhodium (Rh).

In terms of the specular glossiness of an image, the metal element having a standard oxidation-reduction potential nobler than −1.65 V is preferably gold, silver, or platinum, particularly preferably silver.

The plate-like metal particles preferably include silver in an amount of 80% by mass or more relative to the total amount of plate-like metal particles. This enhances the specular glossiness of an image.

The average aspect ratio of the plate-like metal particles according to the present disclosure is 3 or more as described above.

To enhance the specular glossiness of an image, the average aspect ratio of the plate-like metal particles according to the present disclosure is preferably 5 or more, more preferably 10 or more, particularly preferably 12 or more.

Although not particularly limited, the upper limit of the average aspect ratio of the plate-like metal particles is preferably 100, more preferably 70, particularly preferably 50, for ease of production of the plate-like metal particles.

The plate-like metal particle content of the whole ink is preferably 1% to 20% by mass, more preferably 2% to 15% by mass, still more preferably 3% to 10% by mass, particularly preferably 3% to 8% by mass.

A plate-like metal particle content of 1% by mass or more enhances the specular glossiness of an image.

A plate-like metal particle content of 20% by mass or less enhances ink ejectability.

Preferably, the ink according to the present disclosure contains water in terms of, for example, handleability of the ink and reduction in the load on the environment.

The ink according to the present disclosure contains plate-like metal particles including a metal element having a standard oxidation-reduction potential nobler than −1.65 V; therefore, if the ink contains water, oxidation of the metal particles can be inhibited, and as a result, the oxidation-induced reduction in the specular glossiness of an image can be suppressed.

When the ink according to the present disclosure contains water, the water content of the ink is preferably 10% by mass or more, more preferably 30% by mass or more, still more preferably 40% by mass or more, particularly preferably 50% by mass or more, relative to the total amount of ink.

In terms of ink ejectability, the water content of the ink is preferably 90% by mass or less, more preferably 80% by mass or less, particularly preferably 70% by mass or less, relative to the total amount of ink.

When the ink according to the present disclosure contains water, the ink preferably contains gelatin.

This enhances the dispersibility of the plate-like metal particles, thus enhancing the ink ejectability.

When the ink according to the present disclosure contains gelatin, the ratio of the mass content of the plate-like metal particles to the mass content of the gelatin (hereinafter also referred to as "the mass ratio [plate-like metal particle/ gelatin]") is preferably 1 to 100.

To improve the ink ejectability, the ink according to the present disclosure preferably contains an organic solvent. Preferred embodiments of organic solvents that can be contained in the ink will be described later.

The ink according to the present disclosure preferably contains at least one surfactant selected from the group consisting of fluorosurfactants and acetylene glycol surfactants.

When the ink according to the present disclosure contains a fluorosurfactant, wettability on a substrate (particularly, a resin substrate such as a polyethylene terephthalate (PET) film) is improved, and the specular glossiness of an image is enhanced. Although the reason for this is not clear, it is believed that the ink according to the present disclosure, when containing at least one fluorosurfactant, has low surface tension, and the alignment properties of the plate-like metal particles in the ink applied to the substrate (i.e., an image) are enhanced.

When the ink according to the present disclosure contains an acetylene glycol surfactant, benefits are provided, such as improvements in ejectability and the formation of a clear image with reduced bleed. Although the reason for this is not clear, it is believed that the ink according to the present disclosure, when containing at least one acetylene glycol surfactant, has proper surface tension, and the spread of the ink applied to the substrate is suppressed.

Preferred embodiments of fluorosurfactants and acetylene glycol surfactants that can be contained in the ink will be described later.

The components of the ink according to the present disclosure will now be described.

Plate-Like Metal Particles

The ink according to the present disclosure contains at least one type of plate-like metal particles having an average equivalent circle diameter of 10 nm or more and less than 500 nm and an average aspect ratio, which is the ratio of the average equivalent circle diameter to an average thickness, of 3 or more.

Here, "plate-like" in the plate-like metal particles means having a shape with two principal surfaces.

Preferred ranges of the plate-like metal particle content of the ink are as described above.

Shape of Plate-Like Metal Particles

The plate-like metal particles may be of any shape that is plate-like, i.e., that has two principal surfaces, and any such shape can be appropriately selected according to the purpose.

Examples of the shape of the plate-like metal particles include triangles, quadrangles, hexagons, octagons, and circles. In particular, hexagons and higher polygons and circles (hereinafter also referred to as "hexagonal to circular") are preferred in terms of low absorbance in the visible light range.

Any circle can be appropriately selected according to the purpose as long as the plate-like metal particles are cornerless and round when observed from above their principal surface with a transmission electron microscope (TEM).

Any hexagon can be appropriately selected according to the purpose as long as the plate-like metal particles are hexagonal when observed perpendicularly to their principal surface with a transmission electron microscope (TEM).

The angles of such a hexagon may be acute or obtuse and are preferably obtuse because the absorption in the visible light range can be reduced.

The proportion of hexagonal to circular plate-like metal particles in the plate-like metal particles is preferably 60% by number or more, more preferably 65% by number or more, particularly preferably 70% by number or more, relative to the total number of the plate-like metal particles. If the proportion of hexagonal to circular plate-like metal particles is 60% by number or more, the absorbance in the visible light range is further reduced.

Here, "% by number" refers to a proportion (percentage) of the number of hexagonal to circular plate-like metal particles in 500 plate-like metal particles. % by number is determined by observing 500 plate-like metal particles from above their principal surface with a TEM.

Average Equivalent Circle Diameter and Coefficient of Variation

The plate-like metal particles have an average equivalent circle diameter of 10 nm or more and less than 500 nm.

An average equivalent circle diameter of the plate-like metal particles of less than 500 nm improves the ink ejectability (i.e., suppresses nozzle clogging due to the ink).

Furthermore, an average equivalent circle diameter of the plate-like metal particles of less than 500 nm also provides high temporal ink stability.

An average equivalent circle diameter of the plate-like metal particles of 10 nm or more makes it easier to produce the plate-like metal particles.

The average equivalent circle diameter of the plate-like metal particles is preferably 50 nm to 490 nm, more preferably 60 nm to 490 nm, still more preferably 70 nm to 400 nm, particularly preferably 80 nm to 250 nm.

In this specification, the average equivalent circle diameter of the plate-like metal particles means the number average of equivalent circle diameters of 500 plate-like metal particles.

The equivalent circle diameter of each plate-like metal particle is determined by using a transmission electron microscope image (TEM image). Specifically, the equivalent circle diameter is defined as the diameter of a circle having the same area as the area (projected area) of a plate-like metal particle in a TEM image.

An exemplary method of measuring the average equivalent circle diameter of the plate-like metal particles is as described in EXAMPLES below.

The coefficient of variation of a particle size distribution of the plate-like metal particles is preferably 35% or less, more preferably 30% or less, particularly preferably 20% or less.

Here, the coefficient of variation of a particle size distribution of the plate-like metal particles means a value (%) obtained by dividing the standard deviation of equivalent circle diameters (particle size distribution) of 500 plate-like metal particles by the number average of the equivalent circle diameters (average equivalent circle diameter) of the 500 plate-like metal particles and multiplying the quotient by 100.

Average Thickness

In terms of the dispersibility of the plate-like metal particles in the ink and ink ejectability, the average thickness of the plate-like metal particles is preferably 30 nm or less, more preferably 5 nm to 20 nm, particularly preferably 5 nm to 16 nm, more particularly preferably 5 nm to 12 nm.

In this specification, the average thickness of the plate-like metal particles means the number average of thicknesses of 500 plate-like metal particles.

The thickness of the plate-like metal particles is measured by focused ion beam-transmission electron microscopy (FIB-TEM).

An exemplary method of measuring the average thickness of the plate-like metal particles is as described in EXAMPLES below.

Average Aspect Ratio

Preferred ranges of the average aspect ratio of the plate-like metal particles are as described above.

As described above, the average aspect ratio of plate-like metal particles means the ratio of the average equivalent circle diameter to the average thickness [average equivalent circle diameter/average thickness] of the plate-like metal particles.

Method for Synthesizing Plate-Like Metal Particles

Any method for synthesizing the plate-like metal particles can be appropriately selected according to the purpose.

For example, triangular to hexagonal plate-like metal particles may be synthesized by a liquid phase method such as chemical reduction, photochemical reduction, or electrochemical reduction.

Of these, chemical reduction and photochemical reduction are preferred for ease of control of shape and size.

When triangular to hexagonal plate-like metal particles are synthesized, treatment such as etching with a silver-dissolving species such as nitric acid or sodium sulfite or aging by heating may be performed after the synthesis to make the angles of the triangular to hexagonal plate-like metal particles obtuser.

Alternatively, the plate-like metal particles may be synthesized by fixing seed crystals in advance to a surface of a transparent substrate such as a film or a glass plate and then growing crystals to form metal particles (e.g., Ag) such that the particles are shaped like plates.

The plate-like metal particles may be subjected to further treatment to be provided with the desired properties.

Any further treatment can be appropriately selected according to the purpose. Examples of such further treatments include the formation of a highly refractive shell layer described in paragraphs [0068] to [0070] of JP2014-184688A and the addition of various additives described in paragraphs [0072] to [0073] of JP2014-184688A.

Gelatin

When the ink according to the present disclosure contains water, the ink according to the present disclosure preferably contains at least one gelatin in terms of the dispersibility of the plate-like metal particles.

In particular, when the ink according to the present disclosure contains water and further contains at least one gelatin, the dispersibility of the plate-like metal particles is significantly improved.

Examples of gelatins include alkali-treated gelatins obtained by methods involving treatment with alkalis, such as lime, during the process of derivation from collagen; acid-treated gelatins obtained by methods involving treatment with acids such as hydrochloric acid; enzyme-treated gelatins obtained by methods involving treatment with enzymes such as hydrolase; oxygen-treated gelatins; modified gelatins (e.g., phthalated gelatin, succinated gelatin, and trimellitated gelatin) obtained by modifying functional groups such as amino, imino, hydroxy, and carboxy groups contained in gelatin molecules with reagents having one group that can react with these functional groups; and gelatins commonly used in the art, such as those described in JP1987-215272A (JP-S62-215272A) from line 6 of the lower left column of page 222 to the bottom line of the upper left column of page 225.

In terms of the dispersibility of the plate-like metal particles in the ink, the weight-average molecular weight of the gelatin is preferably 5,000 to 1,000,000, more preferably 10,000 to 500,000, still more preferably 20,000 to 200,000.

In this specification, weight-average molecular weights are values measured by gel permeation chromatography (GPC).

The GPC is performed using an HLC-8020GPC (manufactured by Tosoh Corporation), three TSKgel (registered trademark) Super Multipore HZ-H columns (manufactured by Tosoh Corporation, 4.6 mm ID×15 cm), and tetrahydrofuran (THF) as an eluent.

The GPC is performed using a differential refractive index (RI) detector under the following conditions: sample concentration, 0.45% by mass; flow rate, 0.35 ml/min; sample injection volume, 10 μl; measurement temperature, 40° C.

Eight Tosoh TSK standard polystyrene samples: "F-40", "F-20", "F-4", "F-1", "A-5000", "A-2500", "A-1000", and "n-propylbenzene" are used to construct a calibration curve.

The ink according to the present disclosure may contain a dispersing agent other than gelatin.

Examples of dispersing agents other than gelatin include resins other than gelatin and polysaccharides.

Examples of resins other than gelatin include polyvinyl acetal resins, polyvinyl alcohol resins, polyvinyl butyral resins, polyacrylate resins, polymethyl methacrylate resins, polycarbonate resins, polyvinyl chloride resins, (saturated) polyester resins, polyurethane resins, and natural polymers other than gelatin (e.g., cellulose).

When the ink according to the present disclosure contains water and a dispersing agent other than gelatin, the dispersing agent other than gelatin is preferably a water-soluble resin.

In this specification, "water-solubility" refers to the property of being soluble in an amount of 5 g or more (more preferably 10 g or more) in 100 g of water at 25° C.

The water-soluble resin for use can be appropriately selected from the resins other than gelatin listed above.

Organic Solvent

In terms of ink ejectability, the ink according to the present disclosure preferably contains an organic solvent.

When the ink according to the present disclosure contains an organic solvent, the organic solvent content is preferably 5% to 80% by mass, more preferably 5% to 70% by mass, relative to the total amount of ink.

In terms of ink ejectability, the ink according to the present disclosure, when containing water, preferably contains a water-soluble organic solvent as the organic solvent.

The meaning of "water-solubility" in the context of water-soluble organic solvent is as described above.

Any known water-soluble organic solvent can be used.

Examples of water-soluble organic solvents include glycerol, 1,2,6-hexanetriol, trimethylolpropane, and alkane diols such as ethylene glycol, propylene glycol, diethylene glycol, triethylene glycol, tetraethylene glycol, pentaethylene glycol, dipropylene glycol, 2-butene-1,4-diol, 2-ethyl-1,3-hexanediol, 2-methyl-2,4-pentanediol, 1,2-octanediol, 1,2-hexanediol, 1,2-pentanediol, and 4-methyl-1,2-pentanediol (polyhydric alcohols); saccharides such as glucose, mannose, and fructose; sugar alcohols; hyaluronic acids; alkyl alcohols having 1 to 4 carbon atoms, such as ethanol, methanol, butanol, propanol, and isopropanol; glycol ethers such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, tripropylene glycol monomethyl ether, dipropylene glycol mono-n-propyl ether, and dipropylene glycol mono-iso-propyl ether; and pyrrolidones such as 2-pyrrolidone and N-methyl-2-pyrrolidone.

One or two or more of these solvents can be appropriately selected and used.

In addition to the water-soluble organic solvents listed above, those described, for example, in paragraphs 0176 to 0179 of JP2011-46872A and paragraphs 0063 to 0074 of JP2013-18846A can be appropriately selected.

Polyhydric alcohols are also useful as anti-drying agents or wetting agents.

Examples of polyhydric alcohols serving as anti-drying agents or wetting agents include those described in paragraph 0117 of JP2011-42150A.

Other water-soluble organic solvents described, for example, in paragraphs 0176 to 0179 of JP2011-46872A and paragraphs 0063 to 0074 of JP2013-18846A can also be appropriately selected.

Preferably, at least one organic solvent (hereinafter also referred to as "specific organic solvent") having a boiling point of 150° C. or higher and a solubility parameter (hereinafter also referred to as an "SP value") of 24 $MPa^{1/2}$ or more is contained as a water-soluble organic solvent.

One single or two or more specific organic solvents may be contained in the ink according to the present disclosure.

In a preferred embodiment of the ink according to the present disclosure, since the specific organic solvent has a boiling point of 150° C. or higher (i.e., the specific organic solvent has a boiling point higher than that of water), the reduction in ejectability that might otherwise be caused by solvent vaporization is suppressed.

In terms of ink ejectability, the boiling point of the specific organic solvent is more preferably 170° C. or higher, still more preferably 180° C. or higher.

The upper limit of the boiling point of the specific organic solvent is not particularly limited. In terms of ink viscosity, the upper limit of the boiling point of the specific organic solvent is preferably 300° C.

The boiling point can be determined with an ebulliometer (DosaTherm300 manufactured by Titan Technologies).

Boiling points in this specification are boiling points under atmospheric pressure.

In a preferred embodiment of the ink according to the present disclosure, since the specific organic solvent has an SP value of 24 $MPa^{1/2}$ or more, the alignment properties of the plate-like metal particles are improved in the ink applied to a substrate (i.e., an image), with the result that the specular glossiness of the image is improved.

The SP value of the specific organic solvent is more preferably 25 $MPa^{1/2}$ or more, still more preferably 26 $MPa^{1/2}$ or more, particularly preferably 27 $MPa^{1/2}$ or more.

The upper limit of the SP value of the specific organic solvent is not particularly limited. In terms of ink viscosity, the upper limit of the SP value of the specific organic solvent is preferably 40 $MPa^{1/2}$.

In this specification, solubility parameters (SP values) are values [expressed in $MPa^{1/2}$] determined by the Okitsu method. The Okitsu method is a conventionally known method for calculating SP values and is described in detail, for example, in Journal of the Adhesion Society of Japan, Vol. 29, No. 6 (1993), pp. 249 to 259.

Specific examples of specific organic solvents are shown below. Numerical values in parentheses represent boiling points (expressed in ° C.) and SP values (expressed in $MPa^{1/2}$) in the order described.

Examples of specific organic solvents include ethylene glycol (197° C., 29.9 $MPa^{1/2}$), diethylene glycol (244° C., 24.8 $MPa^{1/2}$), triethylene glycol (125° C. (0.1 mmHg, literature data), 27.8 $MPa^{1/2}$), propylene glycol (188° C., 27.6 $MPa^{1/2}$), 1,4-butanediol (230° C., 30.7 $MPa^{1/2}$), 1,2-pentanediol (206° C., 28.6 $MPa^{1/2}$), 1,5-pentanediol (206° C., 29.0 $MPa^{1/2}$), 1,6-hexanediol (250° C., 27.7 $MPa^{1/2}$), glycerol (290° C., 33.8 $MPa^{1/2}$), formamide (210° C., 39.3 $MPa^{1/2}$), dimethylformamide (153° C., 30.6 $MPa^{1/2}$), methanol (65° C., 28.2 $MPa^{1/2}$), isopropyl alcohol (82° C., 28.7 $MPa^{1/2}$), triethanolamine (208° C. (20 MPa), 32.3 $MPa^{1/2}$), polyethylene glycol (250° C., 26.1 $MPa^{1/2}$), 1,2-hexanediol (223° C., 24.1 $MPa^{1/2}$), dipropylene glycol (230° C., 27.1 $MPa^{1/2}$), and 1,2-butanediol (191° C. (747 mmHg, literature data), 26.1 $MPa^{1/2}$).

Of these, propylene glycol, glycerol, and ethylene glycol are preferred in terms of ink ejectability.

When the ink according to the present disclosure contains a water-soluble organic solvent, the water-soluble organic solvent content is preferably 5% to 80% by mass, more preferably 5% to 70% by mass, still more preferably 5% to 50% by mass, particularly preferably 10% to 40% by mass, relative to the total amount of ink.

Water

As described above, the ink according to the present disclosure preferably contains water.

Preferred ranges of the water content are as described above.

Surfactant

The ink according to the present disclosure can contain at least one surfactant.

When the ink according to the present disclosure contains a surfactant, the surfactant is preferably a fluorosurfactant to enhance the specular glossiness of an image.

When the ink according to the present disclosure contains a surfactant, the surfactant is preferably an acetylene glycol surfactant to enhance the ejectability and the clearness of an image.

When the ink according to the present disclosure contains a surfactant, the ink may contain both a fluorosurfactant and an acetylene glycol surfactant.

The amount of surfactant that may be contained in the ink is preferably 0.01% to 5.0% by mass, more preferably 0.01% to 4.0% by mass, still more preferably 0.01% to 3.0% by mass, yet more preferably 0.05% to 1.0% by mass, yet still more preferably 0.1% to 0.5% by mass, relative to the total amount of ink.

When an image is formed on a coated paper (including art paper) substrate, the amount of surfactant that may be contained in the ink may be 0.1% to 4.0% by mass or may be 0.2% to 3.0% by mass.

A surfactant content in this range provides better ink ejectability and allows the surface tension of the ink to be easily adjusted.

Fluorosurfactant

Any fluorosurfactant can be selected from known fluorosurfactants.

Examples of fluorosurfactants include fluorosurfactants described in "Handbook of Surfactants" (edited by Ichiro Nishi, Ichiro Imai, and Shozo Kasai, published by Sangyo Tosho Co., Ltd., 1960).

Fluorosurfactants containing perfluoro groups in their molecules and having refractive indices of 1.30 to 1.42 (preferably 1.32 to 1.40) are preferred.

A fluorosurfactant having a refractive index of 1.30 to 1.42 enhances the specular glossiness of an image.

The refractive index can be measured with a Kalnew Precision Refractometer (KPR-3000 manufactured by Shimadzu Corporation). When the fluorosurfactant is liquid, the refractive index is measured with the fluorosurfactant being placed in a cell. When the fluorosurfactant is solid, the refractive index is measured by a V-block method in which the solid sample is placed in a V-block prism included with the Kalnew Precision Refractometer (KPR-3000 manufactured by Shimadzu Corporation).

The presence of a perfluoro group in the molecule of the fluorosurfactant allows the refractive index of the fluorosurfactant to be easily adjusted to be in the range described above and enables the surface tension of the ink to be adjusted with a relatively small amount.

Examples of fluorosurfactants containing perfluoro groups in their molecules and having refractive indices of 1.30 to 1.42 include anionic surfactants such as perfluoroalkyl carboxylates, perfluoroalkyl sulfonates, and perfluoroalkyl phosphates; amphoteric surfactants such as perfluoroalkyl betaines; cationic surfactants such as perfluoroalkyl trimethyl ammonium salts; and nonionic surfactants such as perfluoroalkylamine oxides, perfluoroalkylethylene oxide adducts, oligomers containing perfluoroalkyl groups and hydrophilic groups, oligomers containing perfluoroalkyl groups and lipophilic groups, oligomers containing perfluoroalkyl groups, hydrophilic groups, and lipophilic groups, and urethanes containing perfluoroalkyl groups and lipophilic groups. Fluorosurfactants described in JP1987-170950A (JP-S62-170950A), JP1987-226143A (JP-S62-226143A), and JP1985-168144A (JP-S60-168144A) are also suitable.

Commercially available fluorosurfactants may be used. Examples include Surflon (registered trademark) series (e.g., S-243 and S-242) available from AGC Seimi Chemical Co., Ltd., MEGAFACE (registered trademark) series (e.g., F-444 and F-410) available from DIC Corporation, NOVEC (registered trademark) series (e.g., 27002) available from 3M, and Zonyl series (e.g., FSE) available from E. I. du Pont de Nemours and Company.

Acetylene Glycol Surfactant

Any acetylene glycol surfactant can be selected from known acetylene glycol surfactants.

Acetylene glycol surfactants represented by general formula (I) are preferred.

One or more acetylene glycol surfactants represented by general formula (I) may be used alone or in combination.

general formula (I)

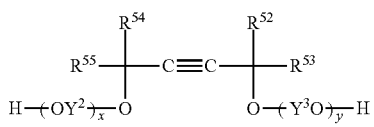

In general formula (I), $R^{52}$, $R^{53}$, $R^{54}$, and $R^{55}$ each independently represent a hydrogen atom or a linear, branched, or cyclic alkyl group having 1 to 8 carbon atoms. $Y^2$ and $Y^3$ each independently represent an alkylene group having 2 to 6 carbon atoms. x and y each represent an average number of moles added, and x and y satisfy $1 \leq x+y \leq 85$.

Examples of linear, branched, or cyclic alkyl groups having 1 to 8 carbon atoms represented by $R^{52}$ and $R^{54}$ include methyl, ethyl, propyl, isopropyl, butyl, isobutyl, 2-butyl, t-butyl, hexyl, cyclohexyl, and octyl groups. When $R^{52}$ and $R^{54}$ each represent a cyclic alkyl group, the number of carbon atoms of the alkyl group is preferably in the range of 3 to 8.

$R^{52}$ and $R^{54}$ are more preferably alkyl groups having 1 to 3 carbon atoms, most preferably methyl groups.

Examples of linear, branched, or cyclic alkyl groups having 1 to 8 carbon atoms represented by $R^{53}$ and $R^{55}$ include methyl, ethyl, propyl, isopropyl, butyl, isobutyl, 2-butyl, t-butyl, hexyl, cyclohexyl, and octyl groups. When $R^{53}$ and $R^{55}$ each represent a cyclic alkyl group, the number of carbon atoms of the alkyl group is preferably in the range of 3 to 8.

$R^{53}$ and $R^{55}$ are each preferably a linear, branched, or cyclic alkyl group having 3 to 8 carbon atoms, particularly preferably an isobutyl group.

x and y each represent an average number of moles added.

The sum of x and y is 1 to 85 ($1 \leq x+y \leq 85$), preferably 3 to 50, more preferably 3 to 30, still more preferably 5 to 30.

If the sum of x and y is 3 or more, enhanced solubility is provided, which leads to a higher clouding point. This enhances the ink ejectability.

$Y^2$ and $Y^3$ each independently represent an alkylene group having 2 to 6 carbon atoms, more preferably an alkylene group having 2 to 4 carbon atoms, still more preferably an alkylene group having 2 or 3 carbon atoms, particularly preferably an alkylene group having 2 carbon atoms (ethylene group).

In other words, among the compounds represented by general formula (I), compounds represented by general formula (II) are more preferred.

general formula (II)

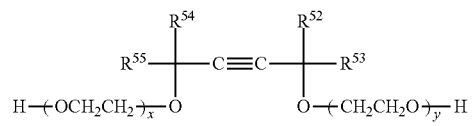

In general formula (II), $R^{52}$, $R^{53}$, $R^{54}$, $R^{55}$, x, and y are as defined in general formula (I), and preferred ranges thereof are also the same.

Examples of acetylene glycol surfactants represented by general formula (I) include alkylene oxide adducts (preferably ethylene oxide adducts) of 2,4,7,9-tetramethyl-5-decyne-4,7-diol, 3,6-dimethyl-4-octyne-3,6-diol, 2,5,8,11-tetramethyl-6-dodecyne-5,8-diol, and 2,5-dimethyl-3-hexyne-2,5-diol. In particular, ethylene oxide adducts of 2,4,7,9-tetramethyl-5-decyne-4,7-diol ($3 \leq x+y \leq 30$, more preferably $5 \leq x+y \leq 30$) are preferred.

Acetylene glycol surfactants represented by general formula (I) can be used alone or in admixture with various additives.

Marketed products may be used as acetylene glycol surfactants represented by general formula (I).

Examples of marketed products include Surfynol series (e.g., Surfynol 420, Surfynol 440, Surfynol 465, and Surfynol 485), Olfine series (e.g., Olfine E1010 and Olfine E1020), and Dynol series (e.g., Dynol 604) available from Air Products and Chemicals, Inc. or Nissin Chemical Co., Ltd.; and Acetylenol available from Kawaken Fine Chemicals Co., Ltd.

Other Components

The ink according to the present disclosure may contain other components in addition to the components described above.

Examples of other components include preservatives and anti-foaming agents.

Regarding the preservatives, refer to the description in paragraphs [0073] to [0090] of JP2014-184688A.

Regarding the anti-foaming agents, refer to the description in paragraphs [0091] and [0092] of JP2014-184688A.

Examples of other components also include surfactants other than fluorosurfactants, solid wetting agents (e.g., urea), anti-fading agents, emulsion stabilizers, penetration enhancers, ultraviolet absorbers, antifungal agents, pH adjusters, viscosity modifiers, antirusts, and chelating agents.

Other components also include polymer particles.

Examples of polymer particles include self-dispersing polymer particles described in paragraphs 0090 to 0121 of JP2010-64480A, paragraphs 0130 to 0167 of JP2011-068085A, and paragraphs 0180 to 0234 of JP2011-62998A.

The ink according to the present disclosure may contain a coloring agent (e.g., a pigment and/or a dye).

The coloring agent is preferably a pigment in terms of, for example, the light resistance of an image or the weather resistance of an image.

Any pigment can be appropriately selected according to the purpose. Examples of pigments include known organic and inorganic pigments. Examples of pigments also include commercially available pigment dispersions and surface-treated pigments (e.g., dispersions of pigments in dispersion media such as water, liquid organic compounds, and insoluble resins and pigments surface-treated with resins, pigment derivatives, or the like).

Examples of organic and inorganic pigments include yellow pigments, red pigments, magenta pigments, blue pigments, cyan pigments, green pigments, orange pigments, purple pigments, brown pigments, black pigments, and white pigments.

When a pigment is used as a coloring agent, a pigment-dispersing agent may be used as required.

For color materials such as pigments and for pigment-dispersing agents, reference can be made as appropriate to paragraphs [0180] to [0200] of JP2014-040529A.

To form a less tinted metallic image, the coloring agent content of the ink according to the present disclosure is preferably 1% by mass or less, more preferably less than 1% by mass, still more preferably 0.1% by mass or less, most preferably 0% by mass (i.e., the ink according to the present disclosure contains no coloring agents), relative to the total amount of ink.

The ink according to the present disclosure may be a photo-curable ink including at least one polymerizable compound. In this case, the ink preferably further includes a polymerization initiator.

Examples of polymerizable compounds include polymerizable compounds (e.g., bi- or more functional (meth)acrylamide compounds) described in paragraphs 0128 to 0144 of JP2011-184628A, paragraphs 0019 to 0034 of JP2011-178896A, and paragraphs 0065 to 0086 of JP2015-25076A.

Examples of polymerization initiators include known polymerization initiators described in paragraphs 0186 to 0190 of JP2011-184628A, paragraphs 0126 to 0130 of JP2011-178896A, and paragraphs 0041 to 0064 of JP2015-25076A.

Preferred Physical Properties of Ink

The physical properties of the ink according to the present disclosure are preferably, but not necessarily, the following physical properties.

The ink according to the present disclosure preferably has a pH at 25° C. (±1° C.) of 7.5 or more.

The pH (at 25° C.±1° C.) of the ink is preferably 7.5 to 13, more preferably 7.5 to 10.

The ink according to the present disclosure preferably has a viscosity in the range of 0.5 mPa·s to 10 mPa·s, more preferably in the range of 1 mPa·s to 7 mPa·s.

The viscosity is measured using a VISCOMETER TV-22 (manufactured by TOKI SANGYO CO., LTD.) under the condition of 30° C.

The ink according to the present disclosure preferably has a surface tension at 25° C. (±1° C.) of 60 mN/m or less, more preferably 20 mN/m to 50 mN/m, still more preferably 25 mN/m to 45 mN/m. A surface tension of the ink of 60 mN/m or less advantageously suppresses curling of substrates. The surface tension is measured using an Automatic Surface Tensiometer CBVP-Z (manufactured by Kyowa Interface Science Co., LTD.) by a plate method.

Applications of Ink

As described above, the ink according to the present disclosure is able to form an image having high specular glossiness on a substrate.

To more effectively produce the effect of specular glossiness, the ink according to the present disclosure is preferably used to form an image having a minimum width of 1 mm or more.

The minimum width of an image formed from the ink according to the present disclosure is more preferably 2 mm or more, particularly preferably 3 mm or more.

Although not particularly limited, the upper limit of the minimum width of an image formed from the ink according to the present disclosure is, for example, 300 mm, preferably 200 mm.

The ink according to the present disclosure is used for all types of image formation by ink jet methods without particular limitation. In particular, the ink is preferably used for decorative printing by an ink jet method.

Here, decorative printing means all types of printing intended to apply decorations to objects. Decorative printing is different from printing intended for other purposes (e.g., printing for printing electronic circuits).

When the ink according to the present disclosure is used for decorative printing, decorations having high specular glossiness can be applied to objects.

Method for Producing Ink

The ink according to the present disclosure can be produced by any method. Mixing of the components described above can be used as appropriate.

Preferably, the ink according to the present disclosure is produced by a method (hereinafter referred to as "Production method A") having a step of providing a dispersion containing plate-like metal particles and a step of mixing together at least the dispersion and the specific organic solvent described above.

When the ink according to the present disclosure contains water, the dispersion in Production method A preferably also contains water.

In Production method A, preferred embodiments of the plate-like metal particles and the specific organic solvent are as described above.

As with the ink according to the present disclosure, the dispersion preferably has a maximum absorption wavelength in the wavelength range of 800 nm to 2,500 nm.

Preferred spectral characteristics of the dispersion are the same as preferred spectral characteristics of the ink according to the present disclosure.

In the mixing step in Production method A, the dispersion and the specific organic solvent may be mixed with a surfactant.

In the mixing step in Production method A, the dispersion and the specific organic solvent (and optionally a surfactant) may be mixed with other components.

Surfactants and other components that may be mixed in the mixing step are respectively the same as the above-described surfactants and other components that may be contained in the ink.

Ink Set

The ink according to the present disclosure described above may be used alone or as at least one ink in an ink set having two or more inks.

An ink set according to the present embodiment has a first ink that is the ink according to the present disclosure described above and a second ink that is different from the first ink, the second ink containing a coloring agent.

The ink set according to the present embodiment may have one single first ink (i.e., the ink according to the present disclosure) or two or more first inks.

The ink set according to the present embodiment may have one single or two or more second inks.

The ink set according to the present embodiment is preferably used to form an image formed by the first ink and an image formed by the second ink on a substrate such that the images overlap each other. In this use, either the image formed by the first ink or the image formed by the second ink may be an underlayer (a layer on the side nearer to the substrate).

When the image formed by the first ink is an underlayer (a layer on the side nearer to the substrate) and the image formed by the second ink is an upper layer (a layer on the side remote from the substrate), a color image having specular glossiness is formed at the portion where the image formed by the first ink and the image formed by the second ink overlap each other.

When the image formed by the second ink is an underlayer and the image formed by the first ink is an upper layer, the image formed by the second ink can be masked by the image (e.g., silver image) formed by the first ink at the portion where the image formed by the first ink and the image formed by the second ink overlap each other.

Second Ink

The second ink may be any known ink containing a coloring agent.

The second ink may be a water-based ink containing water as a main solvent or a solvent-based ink containing a solvent as a main solvent.

The second ink may also be a photo-curable ink containing a polymerizable compound (and preferably a photopolymerization initiator).

The second ink may contain a coloring agent (e.g., a pigment and/or a dye).

The coloring agent is preferably a pigment in terms of, for example, the light resistance of an image or the weather resistance of an image.

Any pigment can be appropriately selected according to the purpose. Examples of pigments include known organic and inorganic pigments. Examples of pigments also include commercially available pigment dispersions and surface-treated pigments (e.g., dispersions of pigments in dispersion media such as water, liquid organic compounds, and insoluble resins and pigments surface-treated with resins, pigment derivatives, or the like).

Examples of organic and inorganic pigments include yellow pigments, red pigments, magenta pigments, blue pigments, cyan pigments, green pigments, orange pigments, purple pigments, brown pigments, black pigments, and white pigments.

When a pigment is used as a coloring agent, a pigment-dispersing agent may be used as required.

For color materials such as pigments and for pigment-dispersing agents, reference can be made as appropriate to paragraphs [0180] to [0200] of JP2014-040529A.

These pigments may be used alone or in combination.

In terms of image concentration, the pigment content of the second ink is preferably 1% by mass or more, more preferably 1% to 20% by mass, still more preferably 2% to 10% by mass, relative to the amount of the second ink.

Preferably, in the ink set according to the present embodiment, the coloring agent content of the first ink is less than 1% by mass (more preferably 0.1% by mass or less) relative to the total amount of the first ink, and the coloring agent content of the second ink is 1% by mass or more (more preferably 1% to 20% by mass, still more preferably 2% to 10% by mass) relative to the total amount of the second ink.

Image Forming Method

Image formation using the ink according to the present disclosure is preferably, but not necessarily, performed by the following image forming method according to the present embodiment.

The image forming method according to the present embodiment has an ink application step of applying the ink according to the present disclosure described above to a substrate by an ink jet method.

The substrate may be, for example, any paper substrate or any resin substrate.

Examples of paper substrates include plain paper, glossy paper, and coated paper.

Glossy paper is a paper substrate including base paper and polymer or porous fine particles disposed on the base paper.

Examples of commercially available products of glossy paper include, but are not limited to, "Kassai (registered trademark)" available from Fujifilm, photo paper and glossy photo paper available from Seiko Epson Corporation, and glossy paper available from Konica Minolta, Inc.

Coated paper is a paper substrate including a base paper and a coating layer disposed on the base paper.

Examples of commercially available products of coated paper include, but are not limited to, "OK Topcoat (registered trademark) Plus" available from Oji Paper Co., Ltd. and "Aurora Coat" available from Nippon Paper Industries Co., Ltd.

To provide an image with higher specular glossiness, the paper substrate is preferably glossy paper or coated paper, more preferably glossy paper.

Examples of resin substrates include resin films.

Examples of resins for resin substrates (e.g., resin films) include polyvinyl chloride (PVC) resins, cellulose diacetate, cellulose triacetate, cellulose propionate, cellulose butyrate, cellulose acetate butyrate, cellulose nitrate, polyethylene terephthalate, polyethylene naphthalate, polyethylene, polystyrene, polypropylene, polycarbonate, polyvinyl acetal, and acrylic resins.

Of these, polyvinyl chloride (PVC) and polyethylene terephthalate (PET) are preferred to provide an image with higher specular glossiness.

The substrate in the image forming method according to the present embodiment may be a substrate already having an image (hereinafter also referred to as an "image X") formed thereon (i.e., a printed matter).

In other words, the image forming method according to the present embodiment may be a method of forming, by using the ink according to the present disclosure, an image on an image X on a substrate already having the image X formed thereon (a printed matter).

To form an image having higher specular glossiness, the substrate in the image forming method according to the present embodiment is preferably glossy paper, coated paper, or a resin substrate, more preferably glossy paper or a resin substrate, particularly preferably a resin substrate.

For the ink jet method, any known system can be appropriately employed: for example, a charge control system, which utilizes electrostatic attraction force to eject ink; a drop-on-demand system (pressure pulse system), which utilizes the oscillating pressure of a piezoelectric element; an acoustic ink jet system, which converts an electric signal into an acoustic beam and applying the acoustic beam to ink, thereby putting radiation pressure on the ink to eject the ink; or a thermal ink jet (Bubble Jet (registered trademark)) system, which heats ink to form bubbles and utilizes the pressure generated.

An ink jet head used in the ink jet method may be of the on-demand type or the continuous type.

The system of ink ejection from the ink jet head may be any system. Specific examples of ejection systems include electromechanical conversion systems (e.g., single cavity type, double cavity type, bender type, piston type, shear mode type, and shared wall type); electrothermal conversion systems (e.g., thermal ink jet type and Bubble Jet (registered trademark) type); electrostatic suction systems (e.g., electric field control type and slit jet type); and electrical ejection systems (e.g., spark jet type).

In ejecting ink by the ink jet method, any ink nozzle can be appropriately selected according to the purpose.

Examples of recording systems in the ink jet method include a shuttle system in which a short serial head is used and recording is performed while scanning a substrate across its width with the head; and a line system (single pass system) which uses a line head in which recording elements are arranged so as to extend across one side of a substrate.

The ink application step is preferably a step of applying ink to a substrate by ejecting the ink through a nozzle of an ink jet head, the nozzle having a nozzle diameter of less than 25 μm.

The ink according to the present disclosure, because of containing plate-like metal particles having an average equivalent circle diameter of less than 500 nm, is less likely to cause nozzle clogging when ejected through a nozzle having a nozzle diameter of less than 25 μm.

A nozzle diameter of less than 25 μm advantageously enables the formation of clearer images.

The nozzle diameter of the nozzle is more preferably 5 μm or more and less than 25 μm, still more preferably 10 μm or more and less than 25 μm, particularly preferably 15 μm or more and less than 25 μm.

The image forming method according to the present embodiment may have a step of drying the ink applied to the substrate.

The drying may be air drying at room temperature or heat drying.

When the substrate is a resin substrate, heat drying is preferred.

The heat drying may be performed by any means such as a heating drum, warm air, an infrared lamp, a hot oven, or hot-plate heating.

The temperature of the heat drying is preferably 50° C. or higher, more preferably about 60° C. to 150° C., still more preferably about 70° C. to 100° C.

The time of the heat drying, which can be appropriately set taking into account the composition and ejection rate of the ink, is preferably 1 minute to 180 minutes, more preferably 5 minutes to 120 minutes, particularly preferably 5 minutes to 60 minutes.

The image forming method according to the present embodiment can also be performed using the ink set according to the present embodiment described above.

When the ink set according to the present embodiment is used, the image forming method has a first ink application step of applying the first ink to a substrate by an ink jet method and a second ink application step of applying the second ink to the substrate by the ink jet method.

Either the first ink application step or the second ink application step may be performed first.

When the ink set according to the present embodiment is used, the image forming method may have the above-described step of drying the ink between the first ink application step and the second ink application step and/or after either the first ink application step or the second ink application step, whichever is performed later.

When the first ink application step is performed before the second ink application step, a preferred embodiment of the image forming method has the first ink application step of applying the first ink to a substrate and the second ink application step of applying the second ink to the first ink applied to the substrate. According to the present embodiment, a color image having specular glossiness can be formed at the portion where the image formed by the first ink and the image formed by the second ink overlap each other.

When the second ink application step is performed before the first ink application step, a preferred embodiment of the image forming method has the second ink application step of applying the second ink to a substrate and the first ink application step of applying the first ink to the second ink applied to the substrate. According to the present embodiment, the image formed by the second ink can be masked by the image (e.g., silver image) formed by the first ink at the portion where the image formed by the first ink and the image formed by the second ink overlap each other.

The preferred embodiment of the first ink application step is the same as the preferred embodiment of the ink application step described above.

The application of the second ink in the second ink application step may be performed by any method for applying ink to a substrate used in known image forming methods.

The second ink application step may be performed under the same conditions as those in the first ink application step or under different conditions from those in the first ink application step.

Printed Matter

The ink according to the present disclosure is suitable for producing a printed matter according to the present embodiment described below.

The printed matter according to the present embodiment includes a substrate and an image disposed on the substrate. The image contains plate-like metal particles that include a metal element having a standard oxidation-reduction potential nobler than −1.65 V, that have an average equivalent circle diameter of 10 nm or more and less than 500 nm, and that have an average aspect ratio of 3 or more.

The definition and the preferred embodiments of the substrate of the printed matter according to the present embodiment are the same as those of the substrate in the image forming method according to the present embodiment.

The preferred embodiments of the plate-like metal particles of the printed matter according to the present embodiment are the same as the preferred embodiments of the plate-like metal particles of the ink according to the present disclosure.

The preferred embodiments (e.g., the minimum width of the image) of the image of the printed matter according to the present embodiment are the same as the preferred embodiments of the image described in the section of "Applications of Ink".

The image of the printed matter according to the present embodiment can contain components described as the components of the ink according to the present disclosure (preferably, components other than water and organic solvents).

The printed matter according to the present embodiment may include a color image containing a coloring agent. The color image is disposed on the image containing the plate-like metal particles and/or between the substrate and the image containing the plate-like metal particles.

When the color image is disposed on the image containing the plate-like metal particles, a color image having specular glossiness is formed at the portion where the image containing the plate-like metal particles and the color image containing a coloring agent overlap each other.

When the color image is disposed between the substrate and the image containing the plate-like metal particles, the color image is masked by the image (e.g., silver image) containing the plate-like metal particles at the portion where the image containing the plate-like metal particles and the color image containing a coloring agent overlap each other.

The printed matter including the color image and the image containing the plate-like metal particles can be formed using the ink according to the present disclosure and a known ink containing a coloring agent.

The printed matter including the color image may be formed using the ink set according to the present embodiment described above.

EXAMPLES

The present invention will now be described in more detail with reference to examples. It should be noted that other examples may be used without departing from the spirit of the present invention.

Preparation of Metal Particle Dispersion A

A metal particle dispersion A was prepared as a dispersion of metal particles. A detailed description will be given below.

Preparation of Metal-Particle-Forming Liquid

A reaction vessel made of high Cr—Ni—Mo stainless steel (NTKR-4 available from Nippon Metal Industry Co., Ltd.) was provided. This reaction vessel included an agitator including a stainless steel (SUS316L) shaft equipped with four propellers made of NTKR-4 and four paddles made of NTKR-4.

In the reaction vessel, 13 L (liters) of ion-exchanged water was stirred with the agitator while adding 1.0 L of 10 g/L aqueous trisodium citrate (anhydride) solution thereto. The resulting solution was kept warm at 35° C.

To the solution kept warm at 35° C., 0.68 L of 8.0 g/L aqueous polystyrene sulfonic acid solution was added, and, furthermore, 0.041 L of aqueous sodium borohydride solution whose sodium borohydride concentration was adjusted to 23 g/L was added. Here, the concentration of the aqueous sodium borohydride solution was adjusted using a 0.04 N aqueous sodium hydroxide (NaOH) solution.

To the solution to which the aqueous sodium borohydride solution was added, 13 L of 0.10 g/L aqueous silver nitrate solution was further added at a rate of 5.0 L/min.

To the resulting solution, 2.0 L of 10 g/L aqueous trisodium citrate (anhydride) solution and 11 L of ion-exchanged water were further added, and 0.68 L of 80 g/L aqueous potassium hydroquinone sulfonate solution was further added.

Next, the stirring speed was increased to 800 rpm (round per minute; hereinafter the same), and then 8.1 L of 0.10 g/L aqueous silver nitrate solution was added at 0.95 L/min, after which the temperature of the resulting solution was decreased to 30° C.

To the solution cooled to 30° C., 8.0 L of 44 g/L aqueous methylhydroquinone solution was added, and then the whole amount of aqueous gelatin solution at 40° C., which will be described later, was added.

The stirring speed was then increased to 1,200 rpm, and the whole amount of silver sulfite white precipitate mixed solution, which will be described later, was added. The pH of the solution to which the silver sulfite white precipitate mixed solution was added was gradually changed.

After the pH of the solution stopped changing, 5.0 L of 1 N (mol/L) aqueous sodium hydroxide (NaOH) solution was added to the solution at 0.33 L/min. The pH of the resulting solution was adjusted to 7.0±1.0 using NaOH and citric acid (anhydride). Next, to the solution after pH adjustment, 0.18 L of 2.0 g/L aqueous 1-(m-sulfophenyl)-5-mercaptotetrazole sodium solution was added, and then 0.078 L of 70 g/L aqueous 1,2-benzisothiazolin-3-one solution adjusted to be alkaline was added.

In this manner, a metal-particle-forming liquid was obtained.

Preparation of Aqueous Gelatin Solution

A SUS316L stainless steel dissolving tank including a SUS316L stainless steel agitator was provided.

In the dissolving tank was placed 16.7 L of ion-exchanged water, and while stirring with the agitator at a low speed, 1.4 kg of alkali-treated bovine bone gelatin (GPC weight-average molecular weight: 200,000) subjected to deionization treatment was added thereto.

To the resulting solution, 0.91 kg of alkali-treated bovine bone gelatin (GPC weight-average molecular weight: 21,000) subjected to deionization treatment, protease treatment, and oxidation treatment with hydrogen peroxide was further added.

Thereafter, the temperature of the solution was increased to 40° C. to swell and at the same time dissolve the gelatin, thereby completely dissolving the gelatin.

In this manner, an aqueous gelatin solution was obtained.

Preparation of Silver Sulfite White Precipitate Mixed Solution

A SUS316L stainless steel dissolving tank including a SUS316L stainless steel agitator was provided.

In the dissolving tank was placed 8.2 L of ion-exchanged water, and 8.2 L of 100 g/L aqueous silver nitrate solution was added thereto.

While stirring the resulting solution with the agitator at a high speed, 2.7 L of 140 g/L aqueous sodium sulfite solution was added thereto in a short time, whereby a mixed solution including a white precipitate of silver sulfite (i.e., a silver sulfite white precipitate mixed solution) was obtained.

This silver sulfite white precipitate mixed solution was prepared immediately before use.

Spectral Characteristics of Metal-Particle-Forming Liquid

The metal-particle-forming liquid described above was diluted with ion-exchanged water and measured for its spectral characteristics using a spectrophotometer (U-3500 manufactured by Hitachi, Ltd.) The maximum absorption wavelength in the wavelength range of 300 nm to 2,500 nm was 900 nm, and the full width at half maximum of the absorption peak at the maximum absorption wavelength was 270 nm.

Physical Properties of Metal-Particle-Forming Liquid

The physical properties of the metal-particle-forming liquid were as follows: pH at 25° C., 9.4 (measured with a KR5E manufactured by AS ONE Corporation); electric conductivity, 8.1 mS/cm (measured with a CM-25R manufactured by DKK-TOA Corporation); viscosity, 2.1 mPa·s (measured with an SV-10 manufactured by A & D Company, Limited).

The metal-particle-forming liquid was put in a 20 L container of Union Container II Type (low-density polyethylene container available from AS ONE Corporation) and stored at 30° C.

Preparation of Metal Particle Dispersion a (Deionization Treatment and Redispersion Treatment)

The metal-particle-forming liquid was subjected to deionization treatment and redispersion treatment to obtain a metal particle dispersion A. The detailed procedure is as follows.

Eight hundred grams of the metal-particle-forming liquid described above was weighed into a centrifuge tube, and the pH was adjusted to 9.2±0.2 at 25° C. using 1 N sulfuric acid.

After the metal-particle-forming liquid after pH adjustment was centrifuged using a centrifuge (himac CR22GIII manufactured by Hitachi Koki Co., Ltd.; angle rotor, R9A) at 35° C. and 9,000 rpm for 60 minutes, 784 g of the supernatant was removed. To the solid left behind (the solid including metal particles and gelatin), 0.2 mmol/L of aqueous NaOH solution was added to a total of 40 g. The resulting solution was stirred by hand with a stirring rod to obtain a crude dispersion X.

By the above procedure, 120 batches of the crude dispersion X were prepared, and the whole crude dispersion X (i.e., 4,800 g in total) was placed in a SUS316L stainless steel tank and mixed. Thereafter, 10 mL of 10 g/L solution (solvent: a mixed solution of methanol and ion-exchanged water in a ratio of 1:1 (by volume)) of Pluronic31R1 (a nonionic surfactant available from BASF) was further added thereto.

Next, using a Model 20 AUTO MIXER (stirring unit: HOMOGENIZING MIXER MARK II) manufactured by PRIMIX Corporation, the mixture of the crude dispersion X in the tank was subjected to a batchwise dispersion treatment at 9,000 rpm for 120 minutes. The temperature of the dispersion during the dispersion treatment was maintained at 50° C.

After the dispersion treatment, the temperature was decreased to 25° C., and then single-pass filtration was performed using a Profile II filter (product type: MCY1001Y030H13, available from Pall Corporation).

By the above procedure, the metal-particle-forming liquid was subjected to deionization treatment and redispersion treatment to thereby obtain the metal particle dispersion A.

Spectral Characteristics of Metal Particle Dispersion A

The spectral characteristics of the metal particle dispersion A were measured by the same method as that used for the metal-particle-forming liquid.

The result was that the maximum absorption wavelength in the wavelength range of 300 nm to 2,500 nm was 900 nm and that the full width at half maximum of the absorption peak at the maximum absorption wavelength was 270 nm.

Physical Properties of Metal Particle Dispersion a and Metal Particle Content

The physical properties of the metal particle dispersion A was as follows: pH at 25° C., 7.0; electric conductivity, 0.08 mS/cm; viscosity, 7.4 mPa·s.

The metal particle content (in Example 1, the plate-like silver particle content) of the metal particle dispersion A was 10% by mass, and the gelatin content was 1% by mass.

The metal particle dispersion A was put in a 20 L container of Union Container II Type and stored at 30° C.

Shape of Metal Particles

The metal particle dispersion A was observed under a transmission electron microscope (TEM) to determine that the shape of the metal particles contained in the dispersion A was plate-like as shown in Table 1.

Average Equivalent Circle Diameter of Metal Particles

The TEM image obtained by observing the metal particle dispersion A under a transmission electron microscope (TEM) was imported into image processing software ImageJ (provided by National Institutes of Health (NIH)) and subjected to image processing.

More particularly, 500 metal particles randomly selected from TEM images of several fields of view were subjected to image analysis, and the diameter of an equivalent circle of equal area was calculated. The calculated values of the diameter of an equivalent circle of equal area of the 500 metal particles were simply averaged (number averaged) to determine the average equivalent circle diameter of the metal particles.

The results are shown in Table 1.

Average Thickness of Metal Particles

The metal particle dispersion A was dropped onto a silicon substrate and dried to prepare an observation sample. Using the observation sample, the thickness of 500 metal particles contained in the metal particle dispersion A was measured by focused ion beam-transmission electron microscopy (FIB-TEM).

The measured values of the thickness of the 500 metal particles were simply averaged (number averaged) to determine the average thickness of the metal particles.

The results are shown in Table 1.

Average Aspect Ratio of Metal Particles

The average equivalent circle diameter was divided by the average thickness to determine the average aspect ratio of the metal particles.

The results are shown in Table 1.

Preparation of Metal Particle Dispersions B to H

Metal particle dispersions B to H were each prepared in the same manner as the preparation of the metal particle dispersion A except that the amount of "13 L of 0.10 g/L aqueous silver nitrate solution" added and the timing of the addition of "5.0 L of 1 N (mol/L) aqueous sodium hydroxide (NaOH) solution" were changed in "Preparation of Metal-Particle-Forming Liquid" described above.

On each of the metal particle dispersions B to H, the same measurements and determinations as performed on the metal particle dispersion A were performed.

The results are shown in Table 1.

Specifically, in the preparation of the metal particle dispersions B to H, the amount of "13 L of 0.10 g/L aqueous silver nitrate solution" added was decreased to increase the average equivalent circle diameter of metal particles formed, thus increasing the average aspect ratio.

The timing of the addition of "5.0 L of 1 N (mol/L) aqueous sodium hydroxide (NaOH) solution" was advanced (e.g., "5.0 L of 1 N (mol/L) aqueous sodium hydroxide (NaOH) solution" was added before the pH of the solution to which the silver sulfite white precipitate mixed solution was added stopped changing) to decrease the average aspect ratio.

Provision of Metal Particle Dispersion I

An "SB11015" aluminum particle dispersion available from ECKART was provided as a metal particle dispersion I.

On the metal particle dispersion I, the same measurements and determinations as performed on the metal particle dispersion A were performed.

The results are shown in Table 1.

Provision of Metal Particle Dispersion J

An "SB11020" aluminum particle dispersion available from ECKART was provided as a metal particle dispersion J.

On the metal particle dispersion J, the same measurements and determinations as performed on the metal particle dispersion A were performed.

The results are shown in Table 1.

| glycerol (organic solvent) | 30% by mass |
| Surflon (registered trademark) S-243 | 0.14% by mass |
| (a fluorosurfactant 1 having a perfluoro group, refractive index = 1.35, available from AGC Seimi Chemical Co., Ltd.) | |
| ion-exchanged water | the balance that makes the total amount 100% by mass |

Shape and Size of Metal Particles Contained in Ink

The shape and size (specifically, shape, average equivalent circle diameter, average thickness, and average aspect ratio) of the metal particles contained in the ink were determined in the same manner as the shape and size of the metal particles contained in the metal particle dispersion A.

The results are shown in Table 2.

Image Formation and Evaluations (Substrate: Glossy Paper)

A dedicated cartridge (Dimatix Materials Cartridge (Jet-powerd)) of an ink jet printer (DMP-2831 manufactured by FUJIFILM DIMATIX) was filled with the ink. The dedicated cartridge had a structure in which an ink cartridge and

TABLE 1

| | Metal particles | | | | | Gelatin |
| Dispersion | Metal | Shape | Average equivalent circle diameter (nm) | Average thickness (nm) | Average aspect ratio | Amount relative to the total amount of dispersion [mass %] | Amount relative to the total amount of dispersion [mass %] |
|---|---|---|---|---|---|---|---|
| A | Ag | plate-like | 120 | 10 | 12 | 10 | 1 |
| B | Ag | plate-like | 80 | 10 | 8 | 10 | 1 |
| C | Ag | plate-like | 310 | 10 | 31 | 10 | 1 |
| D | Ag | plate-like | 490 | 10 | 49 | 10 | 1 |
| E | Ag | plate-like | 240 | 20 | 12 | 10 | 1 |
| F | Ag | plate-like | 90 | 30 | 3 | 10 | 1 |
| G (for comparison) | Ag | plate-like | 600 | 20 | 30 | 10 | 1 |
| H (for comparison) | Ag | spherical | 50 | 50 | 1 | 10 | 1 |
| I (for comparison) | Al | plate-like | 600 | ND | ND | 6 | 0 |
| J (for comparison) | Al | plate-like | 600 | ND | ND | 6 | 0 |

Legend of Table 1
"ND" means No Data.

Example 1

Preparation of Ink

The metal particle dispersion A, organic solvent (glycerol), Surflon (registered trademark) S-243 (fluorosurfactant available from AGC Seimi Chemical Co., Ltd.), and ion-exchanged water were used to prepare an ink having the following composition.

Composition of Ink

| metal particles | 1% by mass |
| (in Example 1, plate-like silver particles) | |
| gelatin | 0.1% by mass |
| (a mixture of alkali-treated bovine bone gelatin having a weight-average molecular weight of 200,000 and alkali-treated bovine bone gelatin having a weight-average molecular weight of 21,000) | | an ink jet head are integrated together. The ink jet head of the dedicated cartridge had 16 nozzles having a nozzle diameter of 21.5 μm.

The dedicated cartridge filled with the ink was then put in the ink jet printer.

Using the ink jet printer, the ink was then ejected through the nozzles of the dedicated cartridge to form a solid image (70 mm long×30 mm wide) on a glossy paper substrate ("Kassai" (registered trademark) available from Fujifilm) at room temperature. The solid image was formed under the following conditions: dot density, 1,200 dpi (dot per inch); the amount of dropping, 23 g/m².

In the image formation, and on the solid image formed, the following evaluations were performed.

The results are shown in Table 2.

Ink Ejectability

During the image formation, the ink jet head nozzles were visually observed to determine the number of nozzles that allowed successful ejection.

On the basis of the observation, the ink ejectability was evaluated according to the following evaluation criteria. In the evaluation criteria, AA and A are suitable for practical use. In Table 2, the ink ejectability is simply expressed as "ejectability".

Evaluation Criteria for Ink Ejectability

AA: Among a total of 16 nozzles, the number of nozzles that allowed successful ejection was 14 to 16.

A: Among a total of 16 nozzles, the number of nozzles that allowed successful ejection was 10 to 13.

B: Among a total of 16 nozzles, the number of nozzles that allowed successful ejection was 7 to 9.

C: Among a total of 16 nozzles, the number of nozzles that allowed successful ejection was 1 to 6.

D: Among a total of 16 nozzles, the number of nozzles that allowed successful ejection was 0.

Specular Glossiness of Image (Gloss Value)

The solid image was measured for its 20° gloss value and 60° gloss value by using a glossmeter (micro-TRI-gloss manufactured by BYK). On the basis of the measurements, the specular glossiness of the image was evaluated according to the following evaluation criteria.

For both the 20° gloss value and the 60° gloss value, higher values indicate higher specular glossiness. Specifically, in the following evaluation criteria, the highest result of the specular glossiness of an image is "S".

Evaluation Criteria for Specular Glossiness of Image (20° Gloss Value)

S: The 20° gloss value is 1000 or more.

AA: The 20° gloss value is 800 or more and less than 1000.

A: The 20° gloss value is 600 or more and less than 800.

B: The 20° gloss value is 300 or more and less than 600.

C: The 20° gloss value is less than 300.

Evaluation Criteria for Specular Glossiness of Image (60° Gloss Value)

S: The 60° gloss value is 1000 or more.

AA: The 60° gloss value is 800 or more and less than 1000.

A: The 60° gloss value is 500 or more and less than 800.

B: The 60° gloss value is 300 or more and less than 500.

C: The 60° gloss value is less than 300.

Specular Glossiness of Image (Sensory Evaluation)

By visually observing the solid image, the specular glossiness of the image was evaluated according to the following evaluation criteria.

The highest result of the specular glossiness of an image is "S".

Evaluation Criteria for Specular Glossiness of Image (Sensory Evaluation)

S: The image has very high specular glossiness, and a reflected object can be clearly seen like an image in a mirror.

AA: The image has high specular glossiness, and a reflected object is distinguishable.

A: The image has specular glossiness, but a reflected object is indistinguishable.

B: Although showing a slight metallic luster, the image has no specular glossiness and reflects no objects.

C: The image is lusterless and looks gray.

Evaluation of Temporal Ink Stability

After the image formation described above, the ink cartridge was left to stand at room temperature for 5 hours. After leaving the ink cartridge to stand, image formation (hereinafter also referred to as "image formation after leaving to stand") was performed in the same manner as the image formation described above.

During the image formation after leaving to stand, the ink jet head nozzles were visually observed to determine the number of nozzles that allowed successful ejection.

On the basis of the observation, the temporal ink stability was evaluated according to the following evaluation criteria. In the evaluation criteria, A and B are suitable for practical use. In Table 2, the temporal ink stability is simply expressed as "temporal stability".

Evaluation Criteria for Temporal Ink Stability

A: Among a total of 16 nozzles, the number of nozzles that allowed successful ejection was 10 or more.

B: Among a total of 16 nozzles, the number of nozzles that allowed successful ejection was 5 to 9.

C: Among a total of 16 nozzles, the number of nozzles that allowed successful ejection was 1 to 4.

D: Among a total of 16 nozzles, the number of nozzles that allowed successful ejection was 0.

Examples 2 to 18 and Comparative Examples 1 to 4

The same procedure as in Example 1 was conducted except that the combination of the type of metal particle dispersion, the amount of metal particles relative to the total amount of ink, and the type of organic solvent was changed as shown in Table 2 below.

The results are shown in Table 2.

In all the examples, the organic solvent content relative to the total amount of ink was 30% by mass.

The amount of metal particles relative to the total amount of ink was changed by changing the amount of metal particle dispersion used for the preparation of ink.

Therefore, the water content in examples where the metal particle content is 1% by mass is about 69% by mass, the water content in examples where the metal particle content is 5% by mass is about 65% by mass, and the water content in examples where the metal particle content is 7% by mass is about 63% by mass.

Comparative Example 5

The same procedure as in Example 1 was conducted except that the ink was changed to an ink for comparison (Comparative Example 5) prepared in accordance with Example 7 of JP2008-523246A.

The results are shown in Table 2.

Preparation of Ink for Comparison (Comparative Example 5)

Regular bone gelatin in an amount of 240 g, 1.5 mL of PLURONIC (trademark) 31R1 (oxirane, methyl-, polymer), and ion-exchanged water were mixed together to prepare 6.9 L of solution. To the solution, 3M $AgNO_3$ and NaCl were added at a solution temperature of 75° C., and double-jet precipitation was performed to prepare a dispersion of 100% AgCl cubic particles (hereinafter also referred to as a "silver chloride dispersion"). Here, the flow rate of the $AgNO_3$ solution was 32 mL/min for initial 2.5 minutes, and the flow rate was then increased to 200 mL/min over 25 minutes.

Thereafter, the flow rate was held at 200 ml/min until 4 L of the AgNO₃ solution was consumed.

Unwanted reaction by-products were removed by washing the silver chloride dispersion by membrane ultrafiltration (UF) to a solution conductivity of less than 10 mS, a pAg of 6.8, and a pH of 5.6. After the washing, additional gelatin was added in an amount of 20 g per molar equivalent of silver.

Next, a developer composition (1 liter) was prepared as described below.

Sodium erythorbate (developer) in an amount of 50.0 g, 3.0 g of HMMP (4'-hydroxymethyl-4-methyl-1-phenyl-3-pyrazolidone; developer), 8.0 g of sodium thiosulfate (fixative), 20 g of K₂CO₃ (buffer), and 900 mL of ion-exchanged water were mixed together, and the pH of the resulting solution was adjusted to 11.5 with BAS-2013. Subsequently, ion-exchanged water was added to a total of 1,000 mL to obtain a developer composition.

A portion (including 2 mol of silver chloride) of the above-described silver chloride dispersion to which 20 g of additional gelatin was added was treated with sodium hydroxide at a dispersion temperature of 40° C., thereby adjusting the pH of the portion to 12. This fogged the silver chloride particles.

The dispersion including the fogged silver chloride particles and 15 L of the developer composition were directly added (rapidly, red light was emitted over approximately two seconds) to a reaction kettle held at 40° C. and then stirred at a high speed using a prop-stirrer. The contents of the reaction kettle went gray within two to three seconds. Subsequently, the pH of the contents of the reaction kettle was maintained over 10 for initial 3 minutes, and the pH was adjusted to 11 for the next 10 minutes, whereby the fogged silver chloride particles were developed to obtain silver particles. The pH adjustment was performed by adding an aqueous sodium hydroxide solution. Subsequently, the solution including the silver particles was washed by UF using an ultrafiltration device and then concentrated to a solution conductivity of less than 20 mS to obtain a silver particle dispersion.

To the silver particle dispersion, a surfactant (ethanesulfonic acid, 2-(2-(2-(4-(1,1,3,3-tetramethylbutyl)phenoxy)ethoxy)ethoxy)-, sodium salt) in an amount of 2% by mass relative to the total amount of silver particle dispersion was added, and the resultant was then treated to a solids content of 71.8 g/kg, thereby obtaining an ink for comparison (Comparative Example 5).

TABLE 2

| | Ink | | | | | | | | Evaluation results (glossy paper) | | | | |
|---|---|---|---|---|---|---|---|---|---|---|---|---|---|
| | Metal particles | | | | | | | | | Specular glossiness of image | | | |
| | Dispersion | Metal | Shape | Average equivalent circle diameter (nm) | Average thickness (nm) | Average aspect ratio | Amount relative to the total amount of ink [mass %] | Organic solvent Type | Ejectability | 20° gloss value | 60° gloss value | Sensory evaluation | Temporal stability |
| Example 1 | A | Ag | plate-like | 120 | 10 | 12 | 1 | GL | AA | A | A | AA | A |
| Example 2 | A | Ag | plate-like | 120 | 10 | 12 | 5 | GL | AA | AA | A | AA | A |
| Example 3 | A | Ag | plate-like | 120 | 10 | 12 | 3 | PG | AA | AA | A | AA | A |
| Example 4 | A | Ag | plate-like | 120 | 10 | 12 | 5 | PG | AA | AA | A | AA | A |
| Example 5 | A | Ag | plate-like | 120 | 10 | 12 | 7 | PG | AA | AA | A | AA | A |
| Example 6 | B | Ag | plate-like | 80 | 10 | 8 | 3 | PG | AA | AA | A | AA | A |
| Example 7 | B | Ag | plate-like | 80 | 10 | 8 | 5 | PG | AA | AA | A | AA | A |
| Example 8 | B | Ag | plate-like | 80 | 10 | 8 | 7 | PG | AA | AA | A | AA | A |
| Example 9 | C | Ag | plate-like | 310 | 10 | 31 | 3 | PG | A | AA | A | AA | B |
| Example 10 | C | Ag | plate-like | 310 | 10 | 31 | 5 | PG | A | AA | A | AA | B |
| Example 11 | C | Ag | plate-like | 310 | 10 | 31 | 7 | PG | A | AA | A | AA | B |
| Example 12 | D | Ag | plate-like | 490 | 10 | 49 | 3 | PG | A | AA | A | AA | B |
| Example 13 | D | Ag | plate-like | 490 | 10 | 49 | 5 | PG | A | AA | A | AA | B |
| Example 14 | D | Ag | plate-like | 490 | 10 | 49 | 7 | PG | A | AA | A | AA | B |
| Example 15 | E | Ag | plate-like | 240 | 20 | 12 | 3 | PG | AA | AA | A | AA | B |
| Example 16 | E | Ag | plate-like | 240 | 20 | 12 | 5 | PG | AA | AA | A | AA | B |
| Example 17 | E | Ag | plate-like | 240 | 20 | 12 | 7 | PG | AA | AA | A | AA | B |
| Example 18 | F | Ag | plate-like | 90 | 30 | 3 | 5 | PG | AA | A | B | AA | A |
| Comparative Example 1 | G | Ag | plate-like | 600 | 20 | 30 | 5 | GL | B | A | B | A | C |
| Comparative Example 2 | H | Ag | spherical | 50 | 50 | 1 | 5 | GL | AA | B | C | B | A |
| Comparative Example 3 | I | Al | plate-like | 600 | ND | ND | 6 | ND | B | B | B | A | D |
| Comparative Example 4 | J | Al | plate-like | 600 | ND | ND | 6 | ND | B | B | B | A | D |
| Comparative Example 5 | — | Ag | cubic | 609 | 540 | 1.1 | 7 | — | C | C | C | C | D |

Legend of Tables 2 to 7
Organic solvents are as follows.
GL glycerol
PG propylene glycol
"ND" Means No Data.

As shown in Table 2, in Examples 1 to 18, in each of which an ink containing plate-like metal particles that included silver (Ag) having a standard oxidation-reduction potential nobler than −1.65 V, that had an average equivalent circle diameter of 10 nm or more and less than 500 nm, and that had an average aspect ratio of 3 or more was used, the ink ejectability, the specular glossiness of an image, and the temporal ink stability were good.

By contrast, in Comparative Examples 1 and 3 to 5, in each of which an ink containing metal particles having an average equivalent circle diameter of more than 500 nm was used, the ink ejectability and the temporal ink stability were poor. In addition, in Comparative Examples 1 and 3 to 5, the poor ink ejectability was accompanied by low specular glossiness of an image.

In Comparative Example 2, in which an ink containing metal particles having an average aspect ratio of less than 3 was used, the specular glossiness of an image was low. This is probably because the small average aspect ratio of the metal particles increased the influence of light scattering on side surfaces (i.e., surfaces other than the two principal surfaces) of the metal particles.

Example 19

The metal particle dispersion A, organic solvent (propylene glycol), Olfine E1010 (acetylene glycol surfactant from Nissin Chemical Co., Ltd.), and ion-exchanged water were used to prepare an ink having the following composition.

Using the ink prepared, the same evaluations as in Example 1 were performed.

The results are shown in Table 3.

Composition of Ink of Example 19

| | |
|---|---|
| metal particles | 1% by mass |
| gelatin (a mixture of alkali-treated bovine bone gelatin having a weight-average molecular weight of 200,000 and alkali-treated bovine bone gelatin having a weight-average molecular weight of 21,000) | 0.1% by mass |
| propylene glycol (organic solvent) | 30% by mass |
| Olfine (registered trademark) E1010 (acetylene glycol surfactant from Nissin Chemical Co., Ltd.) | 0.2% by mass |
| ion-exchanged water | the balance that makes the total amount 100% by mass |

Examples 20 and 21

The same procedure as in Example 19 was conducted except that the amount of metal particles relative to the total amount of ink was changed as shown in Table 3.

The results are shown in Table 3.

In all the examples, the organic solvent content relative to the total amount of ink was 30% by mass. The amount of metal particles relative to the total amount of ink was changed by changing the amount of metal particle dispersion used for the preparation of ink.

TABLE 3

| | Ink Metal particles | | | | | | |
|---|---|---|---|---|---|---|---|
| | Dispersion | Metal | Shape | Average equivalent circle diameter (nm) | Average thickness (nm) | Average aspect ratio | Amount relative to the total amount of ink [mass %] |
| Example 19 | A | Ag | plate-like | 120 | 10 | 12 | 1 |
| Example 20 | A | Ag | plate-like | 120 | 10 | 12 | 2 |
| Example 21 | A | Ag | plate-like | 120 | 10 | 12 | 5 |

| | Ink | | | | | | |
|---|---|---|---|---|---|---|---|
| | Acetylene glycol surfactant | | | Evaluation results (glossy paper) | | | |
| | | | | | Specular glossiness of image | | |
| | Amount relative to the total amount of ink [mass %] | Organic solvent Type | Ejectability | 20° gloss value | 60° gloss value | Sensory evaluation | Temporal stability |
| Example 19 | 0.2 | PG | AA | AA | A | AA | A |
| Example 20 | 0.2 | PG | AA | AA | A | AA | A |
| Example 21 | 0.2 | PG | AA | AA | A | AA | A |

As shown in Table 3, also in Examples 19 to 21, in each of which an acetylene glycol surfactant was used, the ink ejectability, the specular glossiness of an image, and the temporal ink stability were good.

Example 101: Formation of Gold Image

Using a PX-A720 (pigment ink printer manufactured by EPSON), a yellow solid image at a halftone dot rate of 80% was printed in an overlapping manner on the solid image formed in Example 21. In the print setting, EPSON photo paper and the color management system of CMYK primary colors were selected.

The portion where the solid image (metallic image) formed in Example 21 and the yellow solid image overlapped each other assumed a gold color with high specular glossiness. Furthermore, this gold image portion exhibited high abrasion resistance from immediately after printing.

Example 101 is an example that assumes an ink set having at least the ink of Example 21 and a yellow ink.

Example 102: Masking of Image

Using a PX-A720 (pigment ink printer available from EPSON), a yellow solid image at a halftone dot rate of 80% was printed on an unprinted sheet of glossy paper (Kassai available from Fujifilm). After this, the ink of Example 19 was ejected onto the yellow solid image in the same manner as in Example 19, thus forming a solid image.

The image at the portion onto which the ink of Example 19 was ejected had the same color (i.e., silver) as that of the image of Example 19 and exhibited high specular glossiness. This demonstrated that the image of Example 19 was able to mask a color image to form a silver specular surface.

Example 102 is an example that assumes an ink set having at least the ink of Example 19 and a yellow ink.
Image Formation and Evaluations (Substrate: Top-Coated Paper)

In Examples 4, 5, 7, 8, 10, 11, 13, 14, 16, and 17 and Comparative Examples 3 to 5, the same procedures as described in the section of "Image Formation and Evaluations (Substrate: Glossy Paper)" were conducted except that as a substrate, "OK Topcoat (registered trademark) Plus" coated paper available from Oji Paper Co., Ltd. was used in place of the glossy paper (Kassai available from Fujifilm).

The evaluation results of the specular glossiness of an image are shown in Table 4.

Example 22

The metal particle dispersion A, organic solvent (propylene glycol), CAPSTONE (registered trademark) FS-30 (fluorosurfactant from Du Pont), and ion-exchanged water were used to prepare an ink having the following composition.

Using the ink prepared, "Image Formation and Evaluations (Substrate: Top-Coated Paper)" were performed similarly to Example 4.

The evaluation results of the specular glossiness of an image are shown in Table 4.

Composition of Ink of Example 22

| | |
|---|---|
| metal particles | 5% by mass |
| gelatin (a mixture of alkali-treated bovine bone gelatin having a weight-average molecular weight of 200,000 and alkali-treated bovine bone gelatin having a weight-average molecular weight of 21,000) | 0.5% by mass |
| propylene glycol (organic solvent) | 30% by mass |
| CAPSTONE (registered trademark) FS-30 (fluorosurfactant from Du Pont) | 3% by mass |
| ion-exchanged water | the balance that makes the total amount 100% by mass |

TABLE 4

| | Ink | | | | | | | Evaluation results (coated paper) | | |
|---|---|---|---|---|---|---|---|---|---|---|
| | Metal particles | | | | | | | Specular glossiness of image | | |
| | Dispersion | Metal | Shape | Average equivalent circle diameter (nm) | Average thickness (nm) | Average aspect ratio | Amount relative to the total amount of ink [mass %] | Organic solvent Type | 20° gloss value | 60° gloss value | Sensory evaluation |
|---|---|---|---|---|---|---|---|---|---|---|---|
| Example 4 | A | Ag | plate-like | 120 | 10 | 12 | 5 | PG | B | B | A |
| Example 5 | A | Ag | plate-like | 120 | 10 | 12 | 7 | PG | B | B | A |
| Example 7 | B | Ag | plate-like | 80 | 10 | 8 | 5 | PG | B | B | A |
| Example 8 | B | Ag | plate-like | 80 | 10 | 8 | 7 | PG | B | B | A |
| Example 10 | C | Ag | plate-like | 310 | 10 | 31 | 5 | PG | B | B | A |
| Example 11 | C | Ag | plate-like | 310 | 10 | 31 | 7 | PG | B | B | A |
| Example 13 | D | Ag | plate-like | 490 | 10 | 49 | 5 | PG | B | B | A |
| Example 14 | D | Ag | plate-like | 490 | 10 | 49 | 7 | PG | B | B | A |
| Example 16 | E | Ag | plate-like | 240 | 20 | 12 | 5 | PG | B | B | A |
| Example 17 | E | Ag | plate-like | 240 | 20 | 12 | 7 | PG | B | B | A |
| Example 22 | A | Ag | plate-like | 120 | 10 | 12 | 5 | PG | B | B | A |
| Comparative Example 3 | I | Al | plate-like | 600 | ND | ND | 6 | ND | C | C | C |
| Comparative Example 4 | J | Al | plate-like | 600 | ND | ND | 6 | ND | C | C | C |
| Comparative Example 5 | — | Ag | cubic | 609 | 540 | 1.1 | 7 | — | C | C | C |

As shown in Table 4, when coated paper was used as a substrate, the inks of Examples 4, 5, 7, 8, 10, 11, 13, 14, 16, 17, and 22 were able to form an image having high specular glossiness.

For the ink of Example 22, the evaluation result of ejectability was "AA", the evaluation result of temporal stability was "A".

Image Formation and Evaluations (Substrate: PET Film)

In Examples 4, 5, 7, 8, 10, 11, 13, 14, 16, and 17 and Comparative Examples 3 to 5, the same procedures as described in the section of "Image Formation and Evaluations (Substrate: Glossy Paper)" were conducted except that as a substrate, a polyethylene terephthalate (PET) film (Viewful TA available from KIMOTO) was used in place of the glossy paper (Kassai available from Fujifilm) and that an image, after being formed, was dried by heating for 60 minutes on a hot plate at 80° C.

The results are shown in Table 5.

Image Formation and Evaluations (Substrate: Printed Matter)

In Examples 4, 5, 7, 8, 10, 11, 13, 14, 16, and 17 and Comparative Examples 3 and 4, the same procedures as described in the section of "Image Formation and Evaluations (Glossy Paper)" were conducted except that as a substrate, a printed matter produced using Jet Press (available from Fujifilm) was used in place of the glossy paper (Kassai available from Fujifilm) and that an image, after being formed, was dried by heating for 5 minutes on a hot plate at 60° C.

Specifically, the printed matter used was obtained by printing a photographic human image, referred to as an image X, on a sheet of coated paper (OK Topcoat (registered trademark) Plus available from Oji Paper Co., Ltd.) by using Jet Press (available from Fujifilm). A solid image as described above was formed on the image X of the printed

TABLE 5

| | Ink | | | | | | | | Evaluation results (PET film) | | |
|---|---|---|---|---|---|---|---|---|---|---|---|
| | | Metal particles | | | | | | | | Specular glossiness of image | |
| | Dispersion | Metal | Shape | Average equivalent circle diameter (nm) | Average thickness (nm) | Average aspect ratio | Amount relative to the total amount of ink [mass %] | Organic solvent Type | 20° gloss value | 60° gloss value | Sensory evaluation |
| Example 4 | A | Ag | plate-like | 120 | 10 | 12 | 5 | PG | S | A | S |
| Example 5 | A | Ag | plate-like | 120 | 10 | 12 | 7 | PG | S | A | S |
| Example 7 | B | Ag | plate-like | 80 | 10 | 8 | 5 | PG | S | A | S |
| Example 8 | B | Ag | plate-like | 80 | 10 | 8 | 7 | PG | S | A | S |
| Example 10 | C | Ag | plate-like | 310 | 10 | 31 | 5 | PG | S | A | S |
| Example 11 | C | Ag | plate-like | 310 | 10 | 31 | 7 | PG | S | A | S |
| Example 13 | D | Ag | plate-like | 490 | 10 | 49 | 5 | PG | S | A | S |
| Example 14 | D | Ag | plate-like | 490 | 10 | 49 | 7 | PG | S | A | S |
| Example 16 | E | Ag | plate-like | 240 | 20 | 12 | 5 | PG | S | A | S |
| Example 17 | E | Ag | plate-like | 240 | 20 | 12 | 7 | PG | S | A | S |
| Comparative Example 3 | I | Al | plate-like | 600 | ND | ND | 6 | ND | B | B | B |
| Comparative Example 4 | J | Al | plate-like | 600 | ND | ND | 6 | ND | B | B | B |
| Comparative Example 5 | — | Ag | cubic | 609 | 540 | 1.1 | 7 | — | C | C | C |

As shown in Table 5, when a PET film was used as a substrate, the inks of Examples 4, 5, 7, 8, 10, 11, 13, 14, 16, and 17 were able to form an image having high specular glossiness.

matter by using each of the inks of Examples and Comparative Examples, and the solid image formed was dried by heating under the conditions described above.

The results are shown in Table 6.

TABLE 6

| | Ink | | | | | | | | Evaluation results (printed matter) | | |
|---|---|---|---|---|---|---|---|---|---|---|---|
| | | Metal particles | | | | | | | | Specular glossiness of image | |
| | Dispersion | Metal | Shape | Average equivalent circle diameter (nm) | Average thickness (nm) | Average aspect ratio | Amount relative to the total amount of ink [mass %] | Organic solvent Type | 20° gloss value | 60° gloss value | Sensory evaluation |
| Example 4 | A | Ag | plate-like | 120 | 10 | 12 | 5 | PG | B | B | A |
| Example 5 | A | Ag | plate-like | 120 | 10 | 12 | 7 | PG | B | B | A |
| Example 7 | B | Ag | plate-like | 80 | 10 | 8 | 5 | PG | B | B | A |
| Example 8 | B | Ag | plate-like | 80 | 10 | 8 | 7 | PG | B | B | A |
| Example 10 | C | Ag | plate-like | 310 | 10 | 31 | 5 | PG | B | B | A |
| Example 11 | C | Ag | plate-like | 310 | 10 | 31 | 7 | PG | B | B | A |
| Example 13 | D | Ag | plate-like | 490 | 10 | 49 | 5 | PG | B | B | A |

TABLE 6-continued

| | Ink | | | | | | | | Evaluation results (printed matter) | | |
|---|---|---|---|---|---|---|---|---|---|---|---|
| | Metal particles | | | | | | | | Specular glossiness of image | | |
| | | | | Average equivalent circle diameter (nm) | Average thickness (nm) | Average aspect ratio | Amount relative to the total amount of ink [mass %] | Organic solvent Type | 20° gloss value | 60° gloss value | Sensory evaluation |
| | Dispersion | Metal | Shape | | | | | | | | |
| Example 14 | D | Ag | plate-like | 490 | 10 | 49 | 7 | PG | B | B | A |
| Example 16 | E | Ag | plate-like | 240 | 20 | 12 | 5 | PG | B | B | A |
| Example 17 | E | Ag | plate-like | 240 | 20 | 12 | 7 | PG | B | B | A |
| Comparative Example 3 | I | Al | plate-like | 600 | ND | ND | 6 | ND | C | C | C |
| Comparative Example 4 | J | Al | plate-like | 600 | ND | ND | 6 | ND | C | C | C |

As shown in Table 6, when a printed matter was used as a substrate and an image was formed on the image X of the printed matter, the inks of Examples 4, 5, 7, 8, 10, 11, 13, 14, 16 and 17 were able to form an image having high specular glossiness.

Image Formation and Evaluations (Substrate: Art Paper)

In "Image Formation and Evaluations (Substrate: Top-Coated Paper)" of Example 4, Example 22, and Comparative Example 3, the same procedures as in "Image Formation and Evaluations (Substrate: Top-Coated Paper)" were conducted except that as a substrate, art paper (Diamond Premium Gloss Art) available from Mitsubishi Paper Mills Limited was used in place of the top-coated paper.

The results are shown in Table 7.

TABLE 7

| | Ink | | | | | | | | Evaluation results (art paper) | | |
|---|---|---|---|---|---|---|---|---|---|---|---|
| | Metal particles | | | | | | | | Specular glossiness of image | | |
| | | | | Average equivalent circle diameter (nm) | Average thickness (nm) | Average aspect ratio | Amount relative to the total amount of ink [mass %] | Organic solvent Type | 20° gloss value | 60° gloss value | Sensory evaluation |
| | Dispersion | Metal | Shape | | | | | | | | |
| Example 4 | A | Ag | plate-like | 120 | 10 | 12 | 5 | PG | B | B | A |
| Example 22 | A | Ag | plate-like | 120 | 10 | 12 | 5 | PG | B | B | A |
| Comparative Example 3 | I | Al | plate-like | 600 | ND | ND | 6 | ND | B | B | B |

As shown in Table 7, when art paper was used as a substrate, the inks of Examples 4 and 22 were able to form an image having high specular glossiness.

In Examples 4 and 22, the evaluation result of art paper (Table 7) is on par with the evaluation result of coated paper (Table 4). However, the actual visual comparison between Example 4 and Example 22 showed that the image on art paper had a deeper and less uneven metallic luster (specular gloss) than the image on coated paper.

The images of Comparative Example 3, in which aluminum particles were used as metal particles, had a weak metallic luster but had a white haze, regardless of what type of substrate was used.

In contrast to Comparative Example 3, the images of Examples were determined to have a deep metallic luster with no white hazes, i.e., to have specular glossiness, regardless of what type of substrate was used.

The disclosures of JP2016-037730, filed on Feb. 29, 2016, and JP2016-107302, filed on May 30, 2016, are incorporated herein by reference in their entireties.

All documents, patent applications, and technical standards mentioned in this specification are incorporated herein by reference to the same extent as if each individual document, patent application, or technical standard was specifically and individually indicated to be incorporated by reference.

What is claimed is:

1. An ink composition used for image formation by an ink jet method,
the ink composition comprising plate-like metal particles that include a metal element having a standard oxidation-reduction potential nobler than −1.65 V, that have an average equivalent circle diameter of 10 nm or more and less than 500 nm, and that have an average aspect ratio, which is a ratio of the average equivalent circle diameter to an average thickness, of 8 or more.

2. The ink composition according to claim 1, wherein the metal element having a standard oxidation-reduction potential nobler than −1.65 V is at least one metal element selected from the group consisting of gold, silver, and platinum.

3. The ink composition according to claim 1, wherein the plate-like metal particles include silver in an amount of 80% by mass or more relative to the total amount of the plate-like metal particles.

4. The ink composition according to claim 1, wherein a content of the plate-like metal particles is 3% to 8% by mass relative to the total amount of the ink composition.

5. The ink composition according to claim 1, comprising water.

6. The ink composition according to claim 5, comprising gelatin.

7. The ink composition according to claim 6, wherein a ratio of a mass content of the plate-like metal particles to a mass content of the gelatin is 1 to 100.

8. The ink composition according to claim 1, comprising an organic solvent.

9. The ink composition according to claim 1, comprising at least one surfactant selected from the group consisting of fluorosurfactants and acetylene glycol surfactants.

10. The ink composition according to claim 1, wherein the ink composition is used for decorative printing by an ink jet method.

11. An ink set comprising:
a first ink that is the ink composition according to claim 1; and
a second ink that is different from the first ink, the second ink containing a coloring agent.

12. An image forming method comprising an ink application step of applying the ink composition according to claim 1 to a substrate by an ink jet method.

13. The image forming method according to claim 12, wherein in the ink application step, the ink composition is applied to the substrate by ejecting the ink composition through a nozzle of an ink jet head, the nozzle having a nozzle diameter of less than 25 μm.

14. An image forming method that uses the ink set according to claim 11, the method comprising:
a first ink application step of applying the first ink to a substrate by an ink jet method; and
a second ink application step of applying the second ink to the substrate by the ink jet method.

15. A printed matter comprising:
a substrate; and
an image disposed on the substrate, the image containing plate-like metal particles that include a metal element having a standard oxidation-reduction potential nobler than −1.65 V, that have an average equivalent circle diameter of 10 nm or more and less than 500 nm, and that have an average aspect ratio, which is a ratio of the average equivalent circle diameter to an average thickness, of 8 or more.

16. The printed matter according to claim 15, further comprising a color image containing a coloring agent, the color image being disposed on the image containing the plate-like metal particles and/or between the substrate and the image containing the plate-like metal particles.

* * * * *